United States Patent
Miyazaki et al.

(10) Patent No.: US 7,062,751 B2
(45) Date of Patent: Jun. 13, 2006

(54) SEQUENCE ANALYSIS METHOD AND APPARATUS

(75) Inventors: Hiroshi Miyazaki, Kawasaki (JP); Jun Ginbayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 30 days.

(21) Appl. No.: 10/455,445

(22) Filed: Jun. 6, 2003

(65) Prior Publication Data
US 2003/0212984 A1 Nov. 13, 2003

Related U.S. Application Data

(63) Continuation of application No. PCT/JP00/08733, filed on Dec. 8, 2000.

(51) Int. Cl.
*G06F 9/44* (2006.01)

(52) U.S. Cl. ............... 717/116; 717/104; 717/108; 717/105; 717/113; 717/133; 717/109

(58) Field of Classification Search ......... 717/104–10, 717/116, 131, 114, 120, 108, 113, 105, 133, 717/156–157, 109; 707/10, 103 R; 709/223; 706/53; 715/763
See application file for complete search history.

(56) References Cited

U.S. PATENT DOCUMENTS

| | | | | |
|---|---|---|---|---|
| 5,651,101 A | * | 7/1997 | Gotoh et al. ............... 706/53 |
| 5,659,735 A | * | 8/1997 | Parrish et al. .............. 707/10 |
| 5,828,842 A | * | 10/1998 | Sugauchi et al. .......... 709/223 |
| 5,956,725 A | * | 9/1999 | Burroughs et al. ......... 707/101 |
| 6,091,895 A | * | 7/2000 | Govindaraj ................ 717/114 |
| 6,104,872 A | | 8/2000 | Kubota et al. |
| 6,113,649 A | * | 9/2000 | Govindaraj ................ 717/113 |
| 6,134,559 A | * | 10/2000 | Brumme et al. ........ 707/103 R |
| 6,219,826 B1 | * | 4/2001 | De Pauw et al. .......... 717/116 |
| 6,272,672 B1 | * | 8/2001 | Conway ..................... 717/107 |
| 6,275,976 B1 | * | 8/2001 | Scandura ................... 717/120 |
| 6,335,738 B1 | * | 1/2002 | Englefield et al. ......... 715/744 |
| 6,367,077 B1 | * | 4/2002 | Brodersen et al. ......... 717/170 |
| 6,591,274 B1 | * | 7/2003 | Smith et al. ............. 707/104.1 |
| 6,754,681 B1 | * | 6/2004 | Brodersen et al. ......... 707/202 |
| 6,785,882 B1 | * | 8/2004 | Goiffon et al. ............ 717/120 |
| 6,850,893 B1 | * | 2/2005 | Lipkin et al. .................. 705/8 |

FOREIGN PATENT DOCUMENTS

| | | |
|---|---|---|
| JP | 59-57326 A | 4/1984 |
| JP | 61-190653 | 8/1986 |

(Continued)

OTHER PUBLICATIONS

TITLE: A Formal Model and Specification Language for Procedure Calling Conventions, author: Bailey et al, AC, 1995.*

(Continued)

*Primary Examiner*—Chameli C. Das
(74) *Attorney, Agent, or Firm*—Staas & Halsey LLP

(57) ABSTRACT

Overall sequence of a system designed using an object-oriented language is analyzed so as to permit easy comprehension. Class name acquisition means of a sequence analysis apparatus acquires class names included in sequence diagrams. Instance name acquisition means acquires instance names included in the sequence diagrams, and method name acquisition means acquires method names included in the sequence diagrams. Call relationship acquisition means acquires call relationships of methods included in the sequence diagrams. Sequence table display means looks up the thus-acquired class names, instance names, method names and call relationships, to generate and display a sequence table showing a tabulated list of the call relationships of the method.

11 Claims, 22 Drawing Sheets

FOREIGN PATENT DOCUMENTS

| | | |
|---|---|---|
| JP | 63-206866 A | 8/1988 |
| JP | 02-091736 | 3/1990 |
| JP | 04-040566 | 2/1992 |
| JP | 04-044176 | 2/1992 |
| JP | 04-328678 | 11/1992 |
| JP | 6-89282 A | 3/1994 |
| JP | 06-274335 | 9/1994 |
| JP | 6-324853 A | 11/1994 |
| JP | 6-348499 A | 12/1994 |
| JP | 07-319676 | 12/1995 |
| JP | 9-147040 A | 6/1997 |
| JP | 10-011275 | 1/1998 |
| JP | 10-254728 A | 9/1998 |
| JP | 11-53217 A | 2/1999 |
| JP | 11-85492 A | 3/1999 |
| JP | 11-338700 | 12/1999 |
| JP | 2000-132387 A | 5/2000 |
| JP | 2000-284988 | 10/2000 |
| JP | 2000-298600 | 10/2000 |
| WO | WO 02/46921 A1 | 6/2002 |

OTHER PUBLICATIONS

TITLE: An Interactive High-Level Debugger for Control-Flow Optimized Programs, author: Zellweger, ACM, 1993.*

TITLE: Table Object-Oriented Editing of Complex Structures, author: Biggerstaff et al, IEEE, 1984.*

Copies of ISR issued in PCT/JP00/08733 mailed Jan. 30, 2001, in both Japanese and English.

Copies of IPER in PCT/JP00/08733 completed Sep. 26, 2003, in Japanese and English.

Atsushi Ohnishi, et al., "A Supporting System for Verification Among Models of the Unified Modeling Language" (includes English Language Abstract), UML, Object Shikou Saisensen '98, K.K., Asakura Shoten, 12 pp.

Y. Fujimori, Shigoto ni Tsukau Excel 5.0-(4), Nikkei Pasocon, No. 217, Nikkei BP Sha, 1994, 7 pp.

Gold, Michael S. "Using a Scripting Case Tool for Rapid C++Prototypes" Object-Oriented Modeling with Class, Nov. 10, 1995, pp. i-26, XPOO2348714, Retrieved from Internet: URL:http://www.microgold.com/verison2/stage/tutorial/withclasstutorial/withclasstutorialtitle.htm>.

European Search Report, dated Oct. 26, 2005; for application No. 00980029.3 - 2211 PCT/JP0008733; 2 pages.

* cited by examiner

| CONNECTION SOURCE CLASS | CONNECTION SOURCE INSTANCE | SEQUENCE DIAGRAM ID | INSTANCE NAME | GENERATED INSTANCE | CONTROLLER ||||| CONNECTION TARGET CLASS | CONNECTION TARGET INSTANCE |
|---|---|---|---|---|---|---|---|---|---|---|---|
| | | | | | SEQUENCE NO. | METHOD NAME | PARAMETER | RETURN VALUE | | | |
| | | PATTEN | | PATTEN 01 | 1 | RECEIPT OF ORDER | | | | GOODS | |
| | | | | | | | | | | | |
| | | | | | | | | | | | |
| | | | | | | | | | | | |

FIG. 10

GOODS

| CONNECTION SOURCE CLASS | CONNECTION SOURCE INSTANCE | SEQUENCE DIAGRAM ID | INSTANCE NAME | GENERATED INSTANCE | SEQUENCE NO. | METHOD NAME | PARAMETER | RETURN VALUE | CONNECTION TARGET CLASS | CONNECTION TARGET INSTANCE |
|---|---|---|---|---|---|---|---|---|---|---|
| CONTROLLER | | PATTEN | PENCIL | PATTEN 02 | 1 | RECEIPT OF ORDER | | | | |
| | PENCIL | PATTEN | PENCIL | PATTEN 02 | 1.1 | GET QUANTITY | | | STOCK | A WAREHOUSE |
| GOODS | | PATTEN | PENCIL | PATTEN 02 | 1.2 | CALC QUANTITY | | | GOODS | PENCIL |
| | | PATTEN | PENCIL | PATTEN 02 | 1.3 | GET STOCK | | | STOCK | A WAREHOUSE |

FIG. 11

| CONNECTION SOURCE CLASS | CONNECTION SOURCE INSTANCE | SEQUENCE DIAGRAM ID | INSTANCE NAME | GENERATED INSTANCE | SEQUENCE NO. | METHOD NAME | PARAMETER | RETURN VALUE | CONNECTION TARGET CLASS | CONNECTION TARGET INSTANCE |
|---|---|---|---|---|---|---|---|---|---|---|
| | | | | | | | | | STOCK | |
| GOODS | PENCIL | PATTEN | A WAREHOUSE | PATTEN 03 | 1.1 | GET QUANTITY | | | GOODS | |
| GOODS | PENCIL | PATTEN | A WAREHOUSE | PATTEN 03 | 1.3 | GET QUANTITY | | | | |
| | | | | | | | | | | |

FIG. 12

| CONNECTION SOURCE CLASS | CONNECTION SOURCE INSTANCE | SEQUENCE DIAGRAM ID | INSTANCE NAME | GENERATED INSTANCE | SEQUENCE NO. | METHOD NAME | PARAMETER | RETURN VALUE | CONNECTION TARGET CLASS | CONNECTION TARGET INSTANCE |
|---|---|---|---|---|---|---|---|---|---|---|
| | | | | | | GOODS | | | | |
| | | PATTEN | PENCIL | PATTEN 02 | 1.1 | GET QUANTITY | | | STOCK | A WAREHOUSE |
| | | PATTEN | PENCIL | PATTEN 02 | 1.3 | GET STOCK | | | STOCK | A WAREHOUSE |
| GOODS | PENCIL | PATTEN | PENCIL | PATTEN 02 | 1.2 | CALC QUANTITY | | | GOODS | PENCIL |
| CONTROLLER | | PATTEN | PENCIL | PATTEN 02 | 1 | RECEIPT OF ORDER | | | | |

FIG. 14

SEQUENCE ANALYSIS METHOD AND APPARATUS

This application is a continuing application, filed under 35 U.S.C. §111(a), of International Application PCT/JP00/08733, filed on Dec. 8, 2000.

BACKGROUND OF THE INVENTION (1) Field of the Invention

The present invention relates to sequence analysis method and apparatus, and more particularly, to a method and apparatus for analyzing the sequence of a program described in an object language.

(2) Description of the Related Art

When developing a system using an object-oriented language, sequence diagram in UML (Unified Modeling Language) standardized by the OMG (Object Management Group) is considered an important document for implementation.

The sequence diagram indicates call relationships of methods (corresponding to functions in procedural language) in a group of classes related to a predetermined function, and is usually created for each function.

The number of sequence diagrams involved in a whole system, however, often amounts to the order of several hundreds to several thousands, making it difficult to, for example, check up the consistency of methods among the sequence diagrams.

To solve the problem, the sequence diagrams may be integrated into a single drawing to facilitate the checkup. In object-oriented language, however, class is a unit of atomic operation, and thus if the sequence diagrams are merely integrated into a single drawing to allow editing of members in a class, there arises in turn the difficulty of editing on a class-by-class basis.

SUMMARY OF THE INVENTION

The present invention was created in view of the above circumstances, and an object thereof is to provide sequence analysis method and apparatus capable of enhancing surveyability of an entire system designed using an object-oriented language.

To achieve the object, the present invention provides a sequence analysis method for analyzing sequence of a program described in an object language, the method comprising, a class name acquisition step for acquiring class names of classes constituting the program, an instance name acquisition step for acquiring instance names of instances derived from the individual classes, a method name acquisition step for acquiring method names of methods included in the individual instances, a call relationship acquisition step for acquiring call relationships of the individual methods, and a sequence table display step for displaying a sequence table in which are shown a tabulated list of information acquired in the class name acquisition step, the instance name acquisition step and the method name acquisition step, as well as the call relationships of the individual methods obtained based on information acquired in the call relationship acquisition step.

In the class name acquisition step, the class names of classes constituting the program are acquired, and in the instance name acquisition step, the instance names of instances derived from the individual classes are acquired. Then, in the method name acquisition step, the method names of methods included in the individual instances are acquired, and in the call relationship acquisition step, call relationships of the individual methods are acquired. In the sequence table display step, the sequence table is displayed in which are shown a tabulated list of the information acquired in the class name acquisition step, the instance name acquisition step and the method name acquisition step, as well as the call relationships of the individual methods obtained based on the information acquired in the call relationship acquisition step.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 10 is a diagram showing an exemplary sequence table relating to a "Controller" class;

FIG. 11 is a diagram showing an exemplary sequence table relating to a "Goods" class;

FIG. 12 is a diagram showing an exemplary sequence table relating to a "Stock" class;

FIG. 14 is a diagram exemplifying results of a method sorting process;

DESCRIPTION OF THE PREFERRED EMBODIMENTS

Embodiments of the present invention will be hereinafter described with reference to the drawings.

Figure 1:
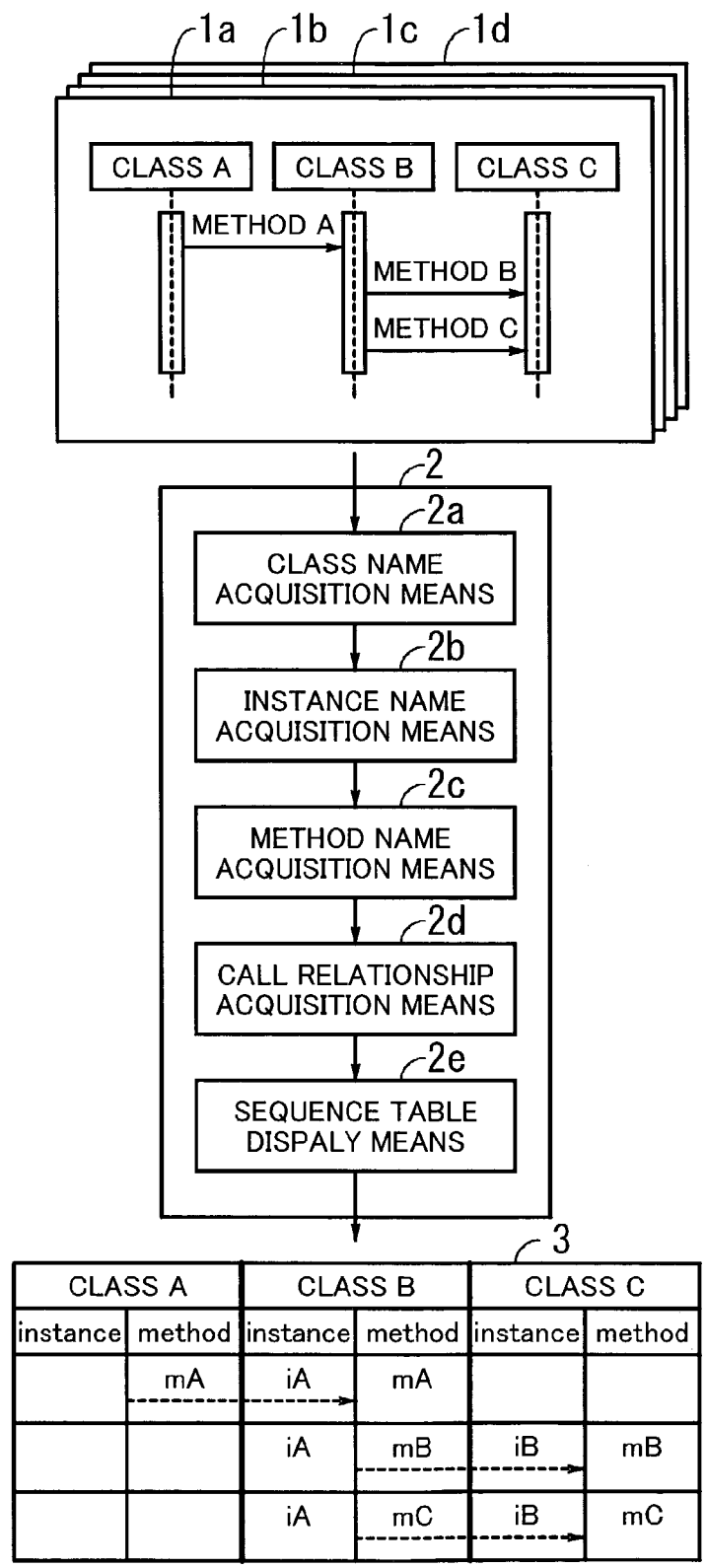
FIG. 1 is a diagram illustrating the principle of operation according to the present invention.

FIG. 1 illustrates the principle of operation according to the present invention. In the figure, a sequence analysis apparatus 2, which carries out a sequence analysis method according to the present invention, loads and analyzes a plurality of sequence diagrams 1a to 1d and outputs a sequence table 3.

The sequence analysis apparatus 2 comprises class name acquisition means 2a, instance name acquisition means 2b, method name acquisition means 2c, call relationship acquisition means 2d, and sequence table display means 2e.

The class name acquisition means 2a acquires the class names of classes constituting a program.

The instance name acquisition means 2b acquires the instance names of instances derived from the individual classes.

The method name acquisition means 2c acquires the method names of methods included in the individual instances.

The call relationship acquisition means 2d acquires call relationships of the individual methods.

The sequence table display means 2e displays a sequence table in which are shown a tabulated list of information acquired by the class name acquisition means 2a, the instance name acquisition means 2b and the method name acquisition means 2c, as well as the call relationships of the individual methods obtained based on information acquired by the call relationship acquisition means 2d.

Operation in accordance with the illustrated principle will be now described.

Let it be assumed that a sequence diagram 1a as well as other sequence diagrams 1b to 1d are selected as sequence diagrams to be analyzed. As illustrated, the sequence diagram 1a is constituted by classes A, B and C, wherein the class A calls a method A of the class B and the class B calls methods B and C of the class C.

The class name acquisition means 2a acquires class names (e.g., "class A" to "class C") included in the sequence diagrams 1a to 1d.

The instance name acquisition means 2b acquires instance names (e.g., "instance A" and "instance B" (not shown)) included in the sequence diagrams 1a to 1d.

The method name acquisition means 2c acquires method names (e.g., "method A" to "method C") included in the sequence diagrams 1a to 1d.

The call relationship acquisition means 2d acquires call relationships (e.g., relationship that "class A calls method A of class B") of methods included in the sequence diagrams 1a to 1d.

The sequence table display means 2e generates a sequence table 3 based on the class names, instance names and method names acquired by the class name acquisition means 2a, instance name acquisition means 2b and method name acquisition means 2c, respectively, as well as the call relationships acquired by the call relationship acquisition means 2d, and displays the generated sequence table.

The sequence table 3 lists all classes included in the sequence diagrams 1a to 1d and shows instances and methods of the individual classes as attributes. Also, the call relationships between methods are indicated by arrows.

The class B, for example, has the method A (mA) which is called from the class A. Also, the class C has the methods B (mB) and C (mC) which are called from the instance A (iA) of the class B. FIG. 1 illustrates only a part of the table corresponding to the sequence diagram 1a, and in practice the contents of classes included in the sequence diagrams 1b to 1d are also displayed.

In the sequence table 3 displayed in the aforementioned manner, the contents thereof can be edited only on a class-by-class basis (e.g., movement, copying or deletion of a class). For example, the class B can be moved to a different position, but the movement of only the method A in the class B is prohibited. Accordingly, the mode of display can be changed so as to meet purposes, and since class-by-class modification alone is permitted, it is possible to eliminate complexity of manipulation (e.g., separate movements of an instance and a method).

As described above, according to the present invention, a single sequence table is generated from a plurality of sequence diagrams, whereby the surveyability of the entire system can be enhanced.

Also, the contents shown in the sequence table permit only the class-by-class modification, and thus complexity of manipulation can be eliminated as mentioned above.

An exemplary configuration according to an embodiment of the present invention will be now described.

Figure 2:
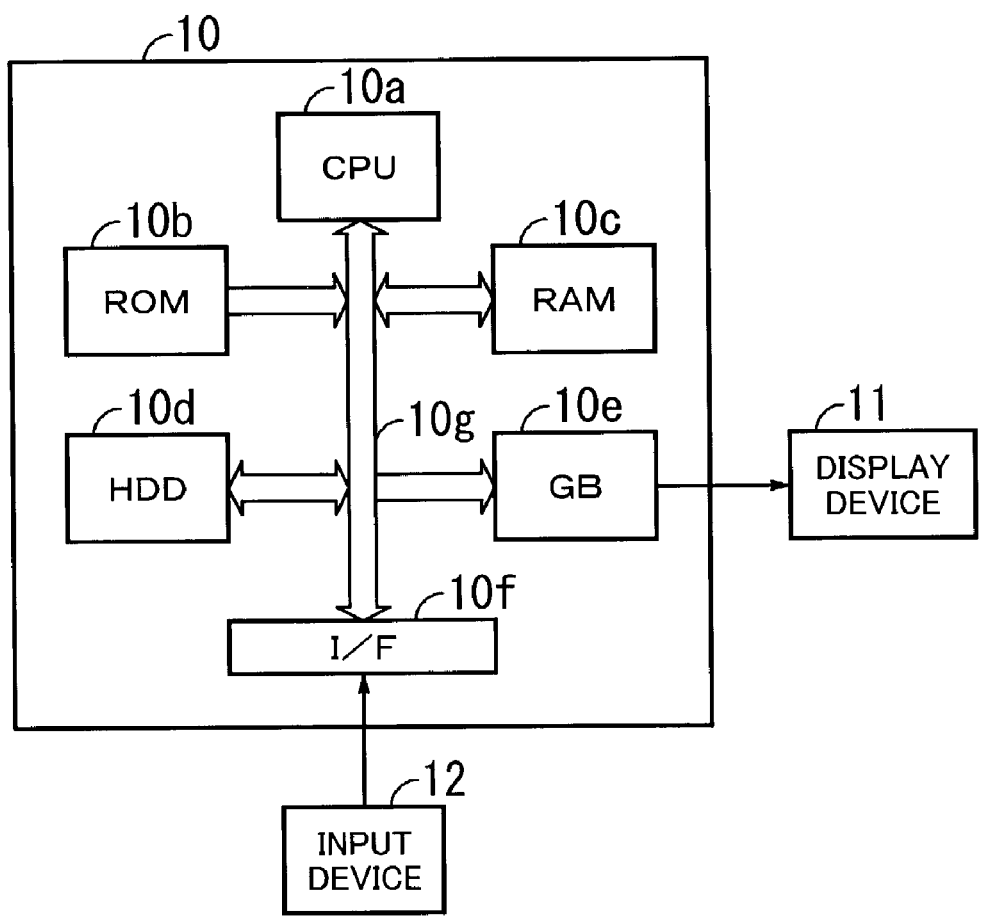
FIG. 2 is a block diagram showing an exemplary configuration according to an embodiment of the present invention.

FIG. 2 illustrates an exemplary configuration of a sequence analysis apparatus for carrying out the sequence analysis method according to the present invention.

As shown in the figure, the sequence analysis apparatus 10 comprises a CPU (Central Processing Unit) 10a, a ROM (Read Only Memory) 10b, a RAM (Random Access Memory) 10c, an HDD (Hard Disk Drive) 10d, a GB (Graphics Board) 10e, an I/F (Interface) 10f, and a bus 10g. A display device 11 and an input device 12 are connected externally to the sequence analysis apparatus.

The CPU 10a controls the individual parts of the apparatus and performs various operations in accordance with programs stored in the HDD 10d.

The ROM 10b stores basic programs executed by the CPU 10a as well as data.

The RAM 10c temporarily stores programs being executed by the CPU 10a and data derived in the middle of operations.

The HDD 10d stores various programs to be executed by the CPU 10a, sequence diagrams to be analyzed, and sequence table data which is the result of analysis.

The GB 10e converts image data obtained in accordance with draw instructions supplied from the CPU 10a, to video signal and outputs the converted signal.

The I/F 10f converts the form of representation of data supplied from the input device 12 to a form conforming to the internal format of the sequence analysis apparatus 10.

The display device 11 comprises a CRT (Cathode Ray Tube) monitor, for example, and displays the video signal output from the GB 10e.

The input device 12 includes, for example, a mouse and a keyboard.

Figure 3:
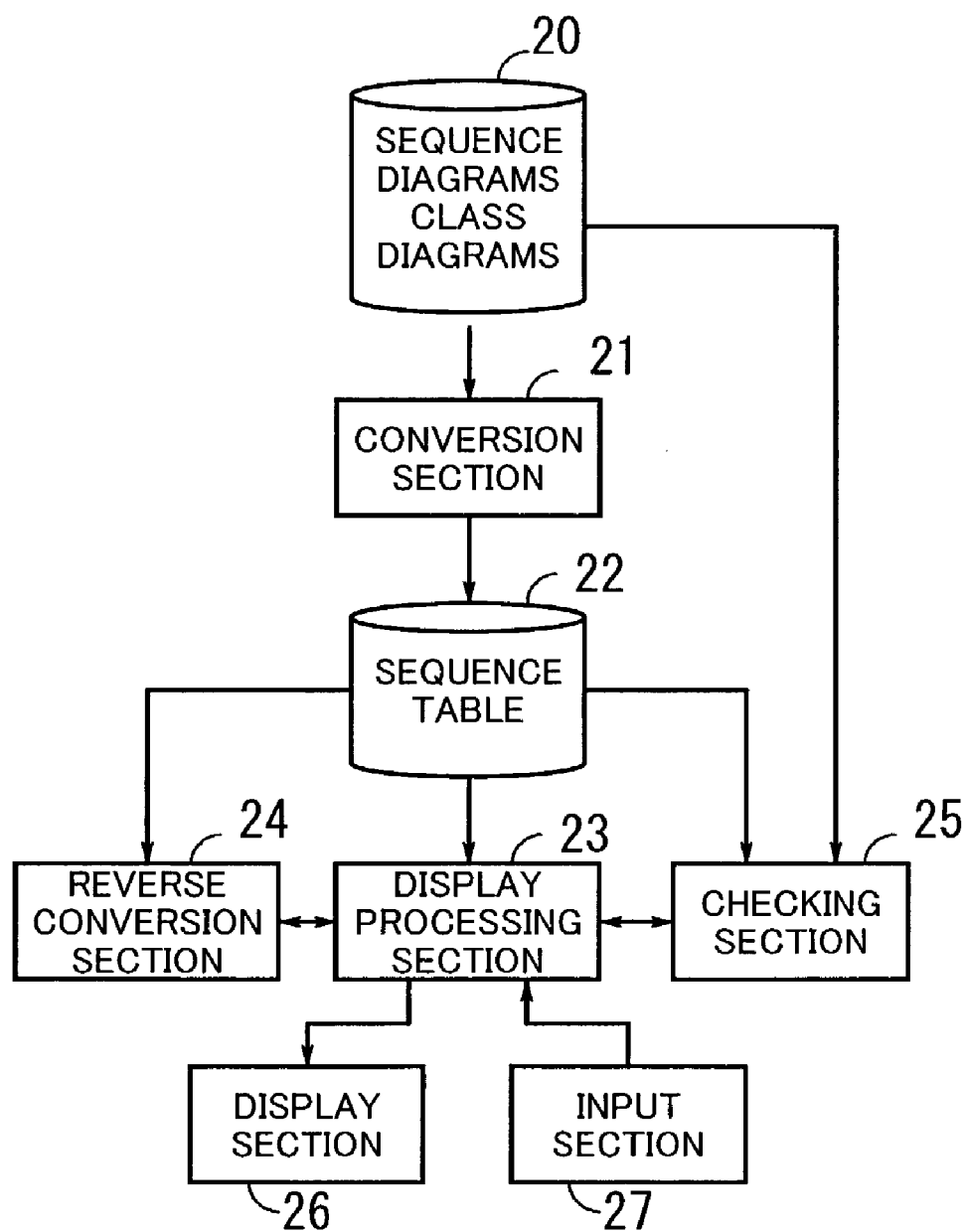
FIG. 3 is a diagram illustrating functional blocks implemented when an application program stored in an HDD of a sequence analysis apparatus shown in FIG. 2 is started.

FIG. 3 illustrates functional blocks implemented when an application program stored in the HDD 10d of the sequence analysis apparatus 10 shown in FIG. 2 is started.

In the figure, a database 20 is constituted by the HDD 10d and stores sequence diagrams and class diagrams (described in detail later) to be processed.

A conversion section 21, which is implemented by the CPU 10a and other elements, acquires necessary items from the sequence diagrams stored in the database 20 and converts the acquired data into a sequence table.

A database 22 is constituted by the HDD 10d and stores the sequence table generated by the conversion section 21.

A display processing section 23, which is implemented by the functions of the CPU 10a and other elements, performs predetermined processes on the sequence table stored in the database 22, and then supplies the results to a display section 26.

A reverse conversion section 24 converts a specified part of the sequence table stored in the database 22 back to a sequence diagram and supplies the result to the display processing section 23.

A checking section 25 checks the contents of the sequence table stored in the database 22 for defects, and supplies the check results to the display processing section 23.

The display section 26 is constituted by the GB 10e and the display device 11 and displays information output from the display processing section 23.

An input section 27 is constituted by the I/F 10f and the input device 12 and supplies information corresponding to the user's operation to the display processing section 23.

Operation of the above embodiment will be now described.

Figure 4:
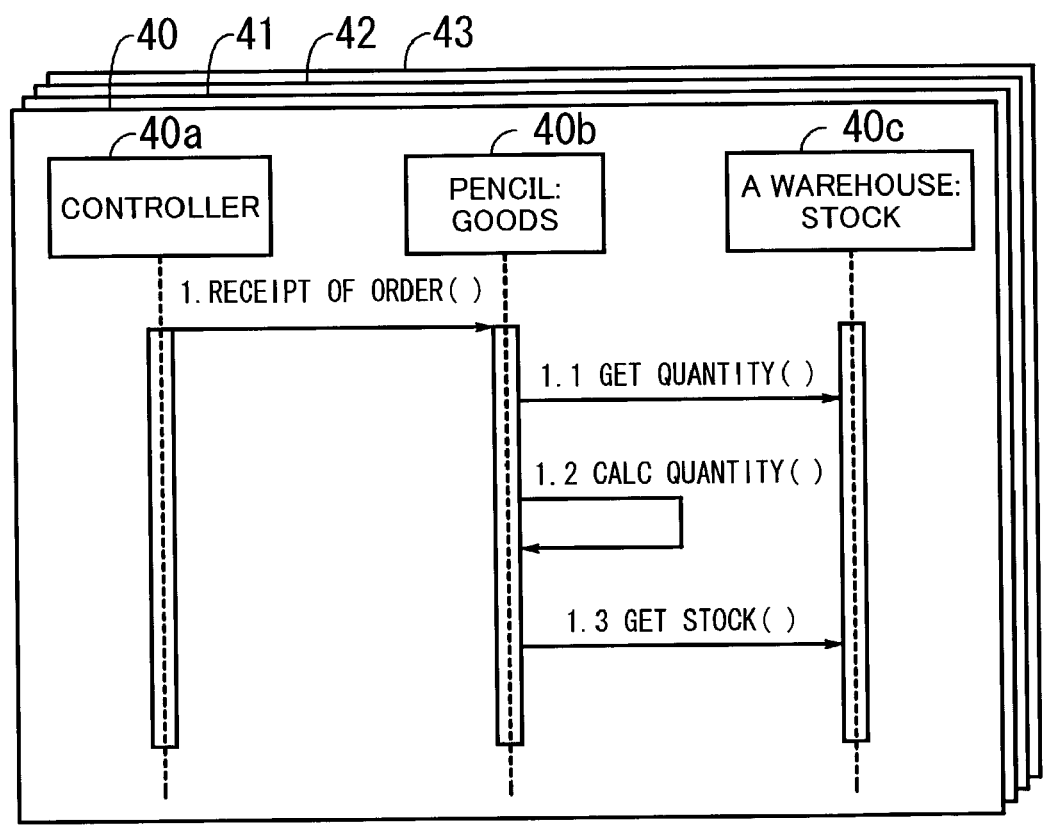
FIG. 4 is a diagram showing exemplary sequence diagrams to be processed.
Figure 5:
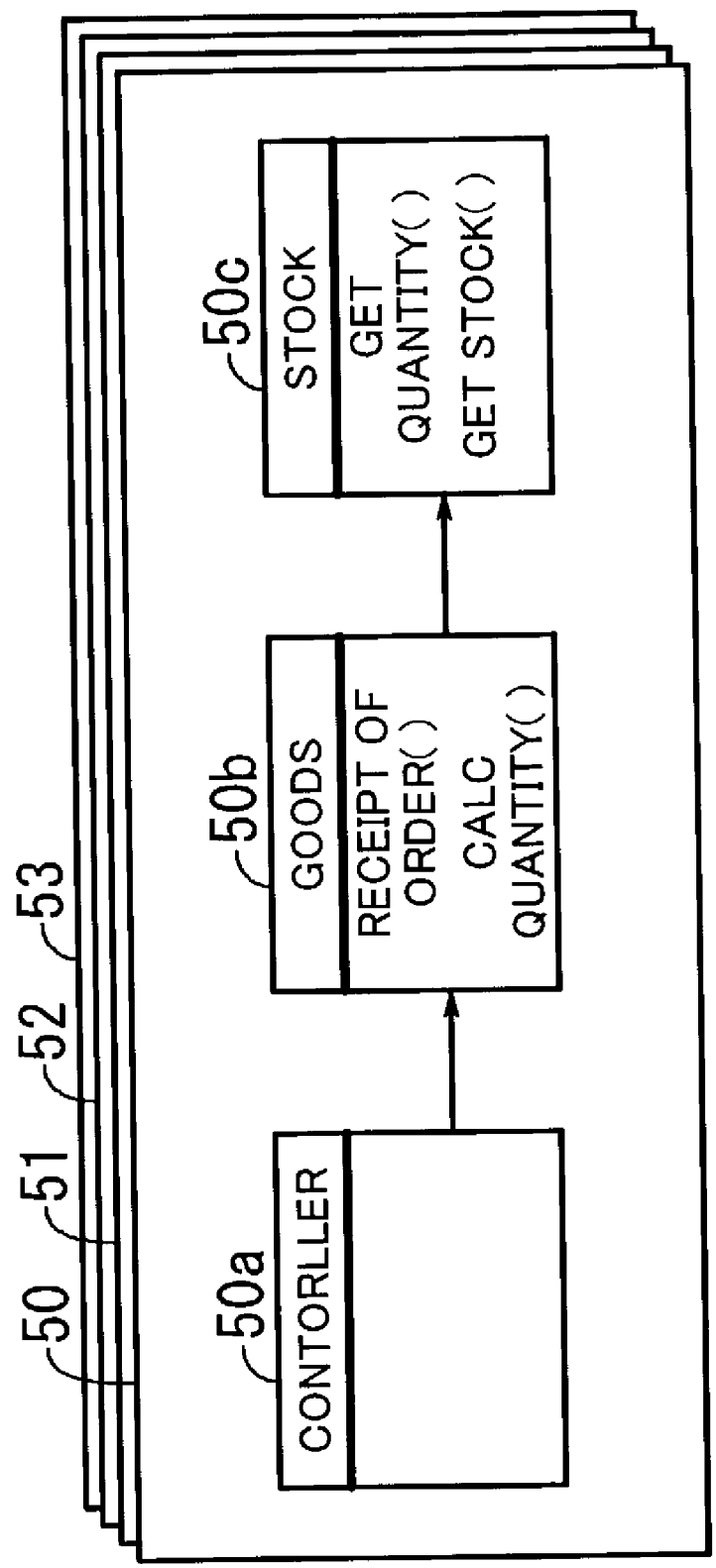
FIG. 5 is a diagram showing exemplary class diagrams to be processed.

Let it be assumed that sequence diagrams 40 to 43 shown in FIG. 4 and class diagrams 50 to 53 shown in FIG. 5 are stored in the database 20. The sequence diagram is a diagram showing call relationships of methods included in instances derived from classes and is generated for each function. The exemplary sequence diagram 40 of FIG. 4 shows a "Controller" class 40a, a "Pencil" instance 40b of a "Goods" class, and an "A Warehouse" instance 40c of a "Stock" class. As indicated by the arrows, the "Controller" class 40a calls a "receipt of order" method of the "Pencil" instance 40b, and the "Pencil" instance 40b calls a "get quantity" method and "get stock" method of the "A Warehouse" instance 40c. Also, the "Pencil" instance 40b calls a "calc quantity" method of its own. The numerical values shown to the left of the individual methods indicate hierarchical levels of their respective method call relationships, as described in detail later.

FIG. 5 illustrates a class diagram showing the relationships between classes and methods included therein. The illustrated example includes four class diagrams 50 to 53, and the contents of the class diagram 50 are exemplified as a processing object. The illustrated class diagram shows a "Controller" class 50a, a "Goods" class 50b, and a "Stock" class 50c. The "Goods" class 50b has the "receipt of order" method and the "calc quantity" method, and the "Stock" class 50c has the "get quantity" method and the "get stock" method. Although the illustrated example shows a plurality of separate class diagrams, the class diagrams may be combined together and may be collectively shown as a single diagram.

To analyze such data as described above, an application program for analysis is started by operating the input device 12, whereupon the CPU 10a loads the corresponding program from the HDD 10d and executes the program. As a result, a screen 60 in accordance with the analysis program, as shown in FIG. 6, is displayed at the display device 11.

In the illustrated example, buttons 61 to 66 are shown under the title "Sequence Analysis", and under these buttons is located a display area 67 for showing data to be analyzed or data indicating the results of analysis.

Figure 6:
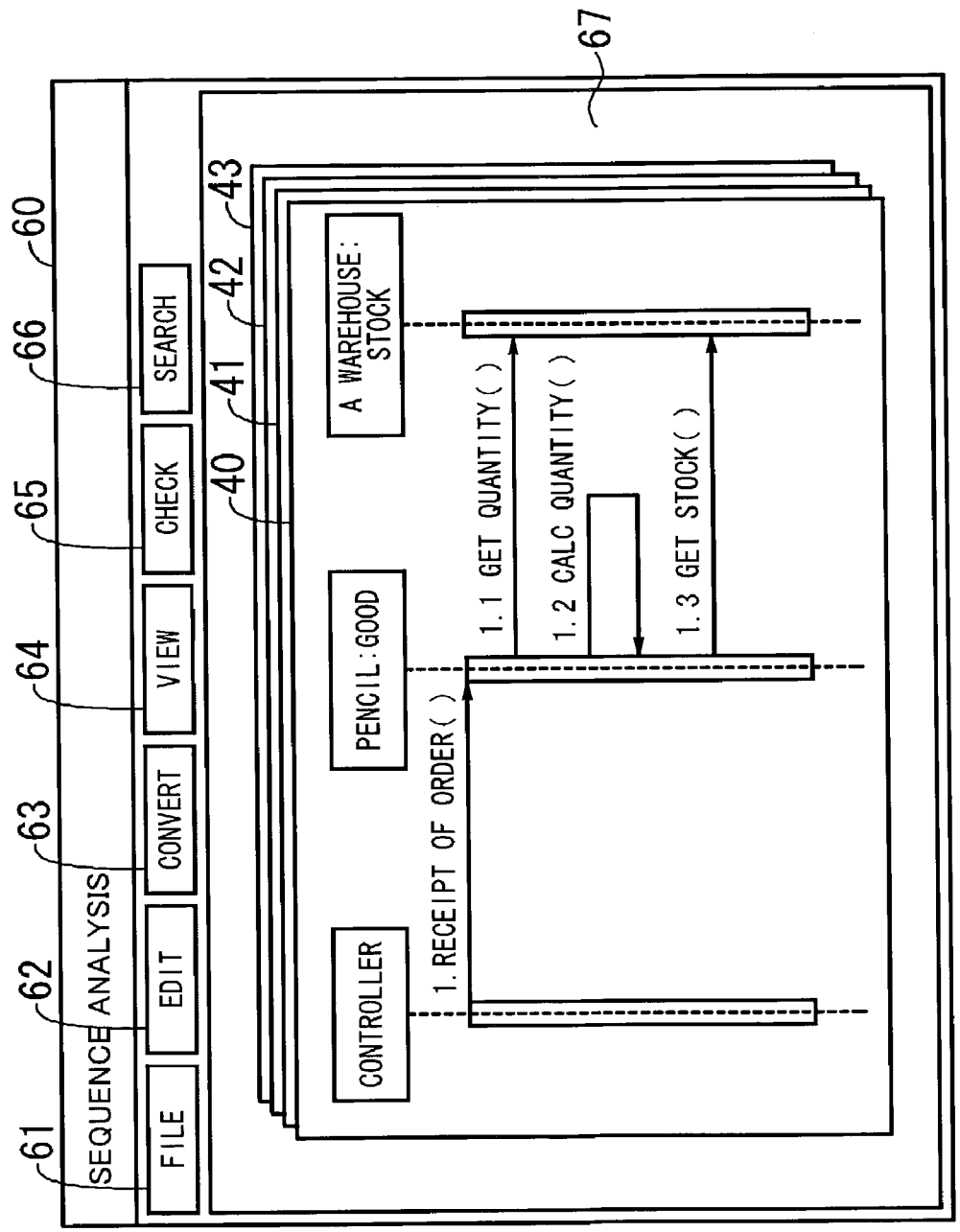
FIG. 6 is a diagram of an exemplary screen displayed when an application program for analysis according to the present invention is started.
Figure 7:
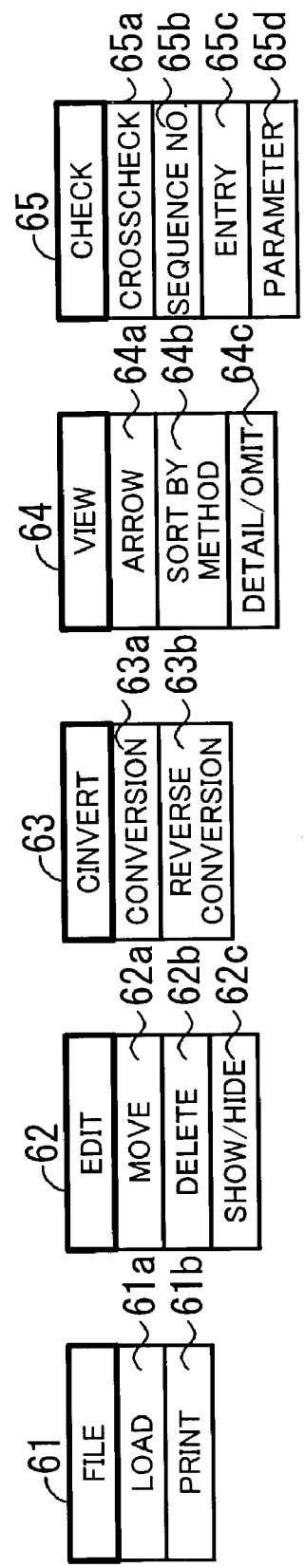
FIG. 7 is a diagram showing exemplary pull-down menus displayed when respective buttons appearing in FIG. 6 are depressed.

FIG. 7 exemplifies pull-down menus displayed when the buttons 61 to 65 shown in FIG. 6 are depressed, respectively. When the button 66 is depressed, a command is directly executed without any pull-down menu being displayed, and therefore, the button 66 is not shown in FIG. 7.

As seen from FIG. 7, depressing the button 61 shows a menu item "Load" 61a, which is selected to load files to be analyzed, and a menu item "Print" 61b, which is selected to print out the contents displayed in the display area 67.

Depressing the button 62 shows a menu item "Move" 62a, which is selected to move a certain class in the sequence table shown in the display area 67, a menu item "Delete" 62b, which is selected to delete the specified class, and a menu item "Show/Hide" 62c, which is selected to show or hide the specified class.

Depressing the button 63 shows a menu item "Conversion" 63a, which is selected to convert the loaded sequence diagrams to a sequence table, and a menu item "Reverse Conversion" 63b, which is selected to convert part of the sequence table back to a sequence diagram.

Depressing the button 64 shows a menu item "Arrow" 64a, which is selected to additionally display arrows indicating the call relationships of methods in the sequence table shown in the display area 67, a menu item "Sort By Method" 64b, which is selected to display similar or identical methods close to one another, and a menu item "Detail/Omit" 64c, which is selected to add or omit display items of classes.

Depressing the button 65 shows a menu item "Crosscheck" 65a, which is selected to crosscheck the contents of the sequence table and class diagram, a menu item "Sequence No." 65b, which is selected to check up the propriety of sequence numbers assigned to respective methods in the sequence table, a menu item "Entry" 65c, which is selected to check up the entry method, and a menu item "Parameter" 65d, which is selected to check up the parameters of methods.

If, on the screen 60 shown in FIG. 6, the button 61 is depressed and after the menu item "Load" 61a is selected, the sequence diagrams 40 to 43 shown in FIG. 4 are selected as objects to be analyzed, the conversion section 21 loads the sequence diagrams 40 to 43 from the database 20. As a result, the sequence diagrams 40 to 43 are displayed in the display area 67 of the screen 60, as shown in FIG. 6.

Figure 8:
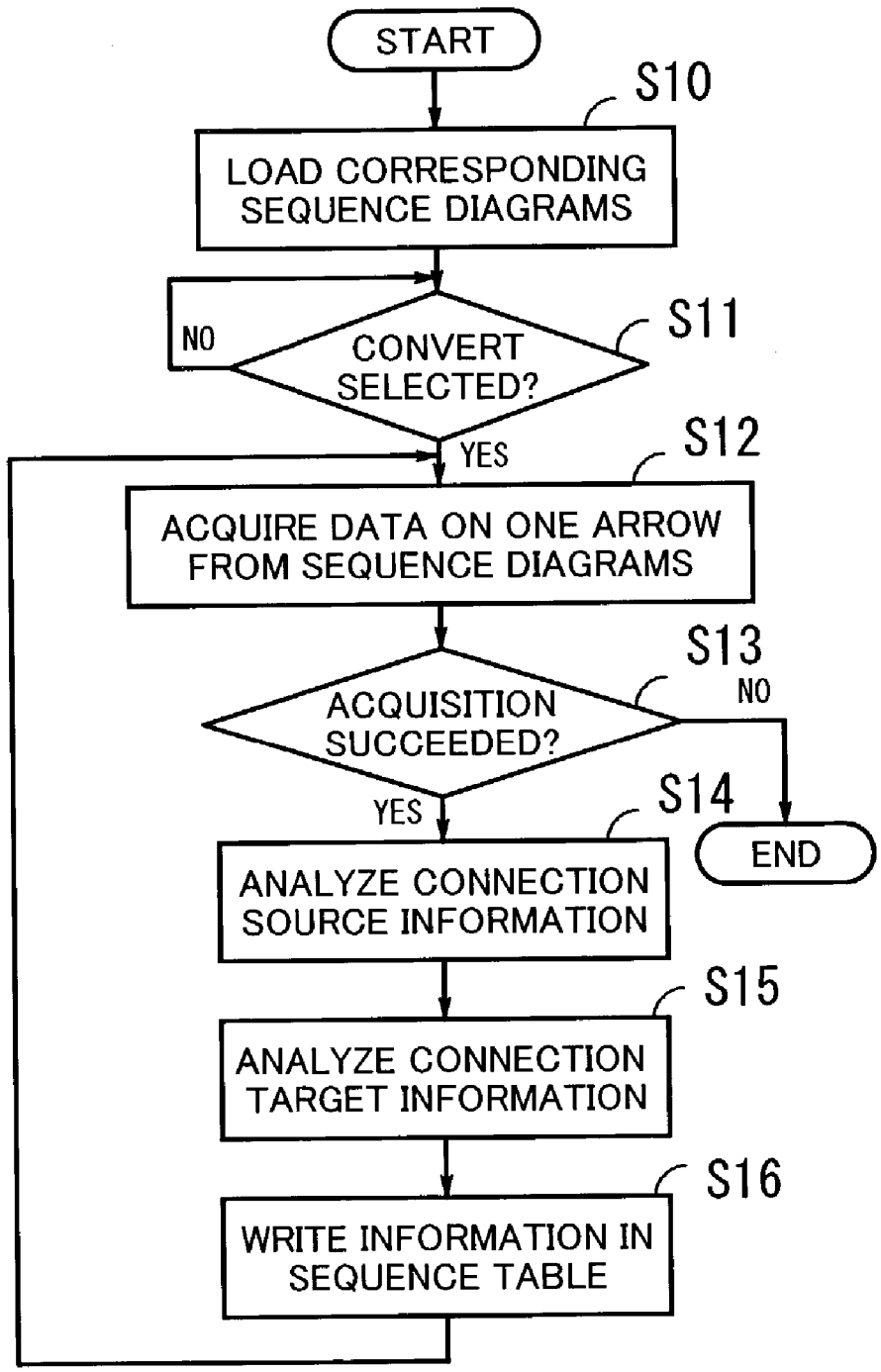
FIG. 8 is a flowchart illustrating an exemplary process for converting sequence diagrams to a sequence table, executed when a menu item "Conversion" 63a is selected following the depression of a button 63.

Then, if the button 63 is depressed and the menu item "Conversion" 63a is selected, the conversion section 21 executes a process for converting the sequence diagrams to a sequence table. An example of the process will be described with reference to FIG. 8. When the process shown in the flowchart of FIG. 8 is started, the following steps are executed.

Step S10:
The conversion section 21 loads the sequence diagrams specified following the selection of the menu item "Load" 61a, from the database 20.

Step S11:
If the menu item "Conversion" 63a is selected following the depression of the button 63, the conversion section 21 executes Step S12; if not, this step is repeated.

Step S12:
The conversion section 21 acquires data relating to one arrow from the sequence diagrams. Specifically, data indicating the connection source class and connection target class of an arrow is acquired from the database 20.

Step S13:
If the acquisition of arrow data is successful, that is, if there exists unprocessed arrow data and such arrow data is acquired, the conversion section 21 executes Step S14; if not, it is judged that the processing of all arrows has been completed and thus the process is ended.

Step S14:

The conversion section 21 analyzes information on the source of connection of the arrow. Specifically, the conversion section 21 analyzes the information about the connection source of the arrow to acquire connection source class, connection source instance, sequence diagram ID, instance name, generated instance, sequence No., method name, parameter, return value, connection target class, and connection target instance.

The connection source class and the connection source instance respectively represent the source class and instance to which the arrow is connected. The sequence diagram ID represents the ID (Identification) of the sequence diagram including the source and target classes to which the arrow is connected. The instance name indicates the name of the connection source instance, and the generated instance indicates an identification code automatically assigned by the conversion section 21. The sequence No. is a serial number assigned to each method so as to reflect the hierarchical structure of classes. The method name indicates the name of the method, and the parameter and the return value respectively indicate the parameter (argument) and return value of the method. The connection target class and the connection target instance respectively represent the class and instance as the target of connection.

Step S15:

The conversion section 21 analyzes information on the target of connection of the arrow. Specifically, the conversion section 21 analyzes the information about the connection target of the arrow to acquire connection source class, connection source instance, sequence diagram ID, instance name, generated instance, sequence No., method name, parameter, return value, connection target class, and connection target instance. These items of information are identical with those explained above.

Step S16:

The acquired information on the connection source and target of the arrow is written into a sequence table, whereupon the flow returns to Step S12 to repeat the subsequent process in the same manner as described above.

Figure 9:
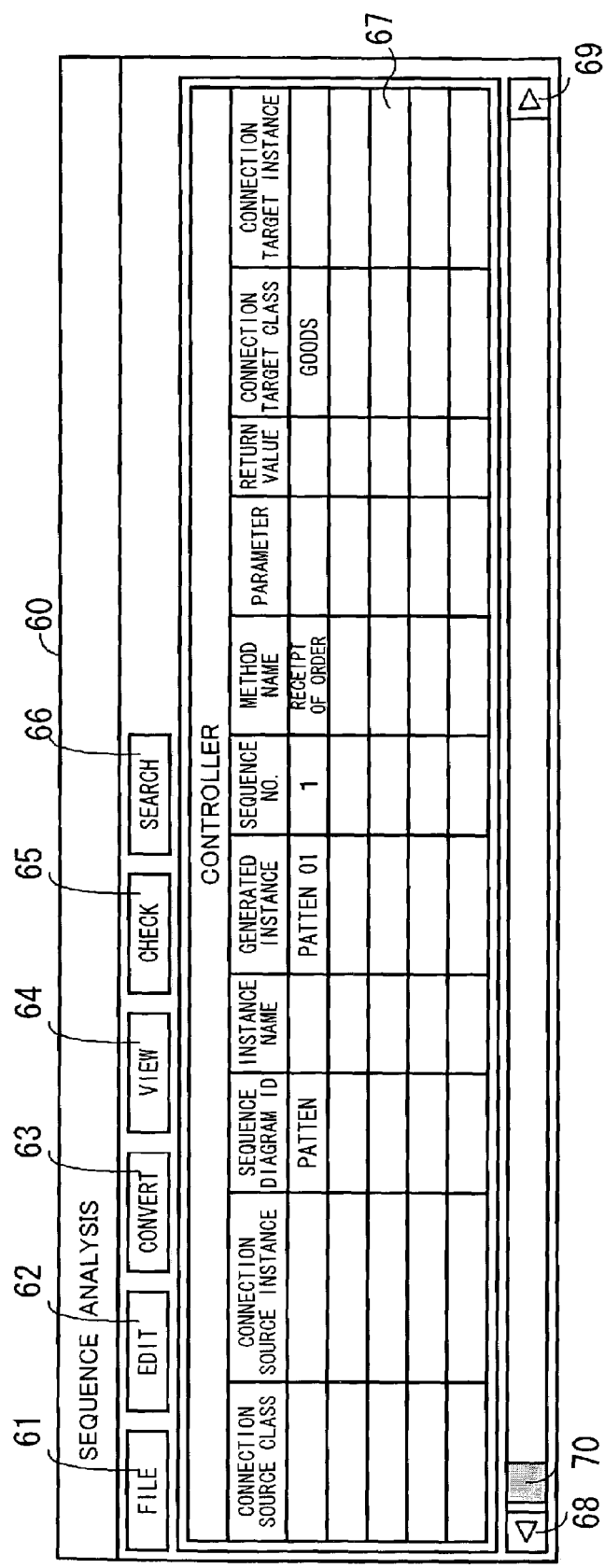
FIG. 9 is a diagram showing an example of how a sequence table generated by the conversion process is displayed.

The sequence table generated as a result of the aforementioned process is displayed in the display area 67 of the screen 60, as shown in FIG. 9. In the illustrated example, only the part of the sequence table relating to the "Controller" class 50a is displayed. The "Goods" class 50b and the "Stock" class 50c can be made to appear in the display area 67 by moving a slider 70 or depressing buttons 68 and 69.

Due to limitations of space, the sequence table including all classes cannot be shown collectively, and in the following, therefore, parts of the sequence table relating to the respective classes will be separately described in detail.

FIG. 10 illustrates an exemplary sequence table relating to the "Controller" class 50a. In the illustrated example, connection source class, connection source instance, sequence diagram ID, instance name, generated instance, sequence No., method name, parameter, return value, connection target class and connection target instance are displayed as column items. Data relating to each of the arrows in the sequence diagrams shown in FIG. 4 is stored in each row of the table. In the example of FIG. 10, data corresponding to the "receipt of order" method in the sequence diagram shown in FIG. 4 is stored by way of example. Specifically, for the "receipt of order" method, "Patten" is set as the sequence diagram ID, "Patten01" as the generated instance, "1" as the sequence No., "receipt of order" as the method name, and "Goods" as the connection target class.

FIG. 11 illustrates an exemplary sequence table relating to the "Goods" class 50b. In the illustrated example, the items in the first row hold information corresponding to the "receipt of order" method shown in the first row in FIG. 10. Namely, "Controller" is set as the connection source class, "Patten" as the sequence diagram ID, "Pencil" as the instance name, "Patten02" as the generated instance, "1" as the sequence No., and "receipt of order" as the method name.

Thus, by looking up the items in the first rows in FIGS. 10 and 11, it is possible to acquire information about the source and target of connection of the arrow in the original sequence diagram.

FIG. 12 illustrates an exemplary sequence table relating to the "Stock" class 50c. The illustrated example holds information about the connections of the methods "get quantity" and "get stock" appearing in FIG. 11. Specifically, as the information corresponding to the method "get quantity", "Goods", "Pencil", "Patten", "A Warehouse", "Patten03", "1.1" and "get quantity" are stored under the connection source class, connection source instance, sequence diagram ID, instance name, generated instance, sequence No. and method name, respectively.

As explained above, according to this embodiment, a single sequence table is generated from a plurality of sequence diagrams and displayed, so that the structure of the entire system can be surveyed at a glance.

Also, the conversion of sequence diagrams to a sequence table permits the information to be stored in a relational database, whereby search and editing of items can be easily performed by making use of the functions of the relational database, as described below.

Figure 13:
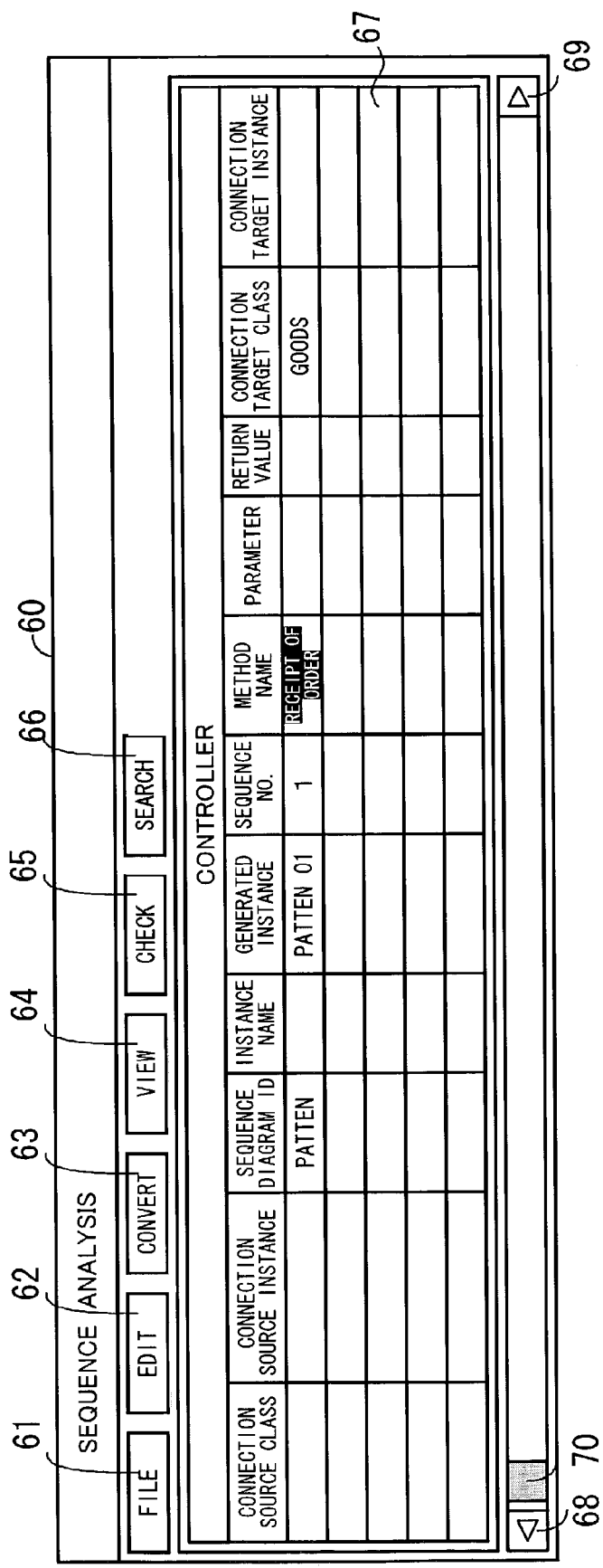
FIG. 13 is a diagram of an exemplary screen showing results of search conducted with a character string entered following the depression of a button 66.

FIG. 13 illustrates a procedure for searching for a certain character string included in the sequence table. To search for a character string, first, the button 66 is depressed, and as a result, a character string input screen (not shown) is displayed. In the displayed screen, the character string to be searched for is input and an operation to start the search is performed, whereupon the display processing section 23 acquires the input character string from the input section 27 and searches the sequence table for a matching character string. If a matching character string is found, the corresponding part of the sequence table is highlighted. FIG. 13 illustrates the result of search conducted with "receipt of order" entered as the character string to be searched for. In the illustrated example, the method name "receipt of order" is highlighted. Thus, it is possible to quickly find an item corresponding to the input character string.

Referring now to FIG. 14, a process executed when the menu item "Sort By Method" 64b is selected following the depression of the button 64 will be described.

When the menu item "Sort By Method" 64b is selected, the display processing section 23 sorts the methods included in the sequence table such that methods with identical or similar names are located close to one another, and then supplies the sorted information to the display section 26 to be displayed.

As a result, the items in the sequence table relating to the "Goods" class 50b are sorted such that the methods "get quantity" and "get stock" are shown one after the other, as illustrated in FIG. 14. Thus, since identical or similar methods are located close to one another, it is possible to check with ease the manner of calling identical methods, which appear scatteringly in different sequence diagrams according to conventional techniques, as well as the consistency and conformity of usage etc. of methods. Instead of making identical or similar methods located close to one another in the aforesaid manner, the method names may be sorted in alphabetical order or in order of the Japanese syllabary, for example, and also in this case, similar methods are shown close to one another, making it possible find with ease typographical errors etc. of method names.

Figure 15:
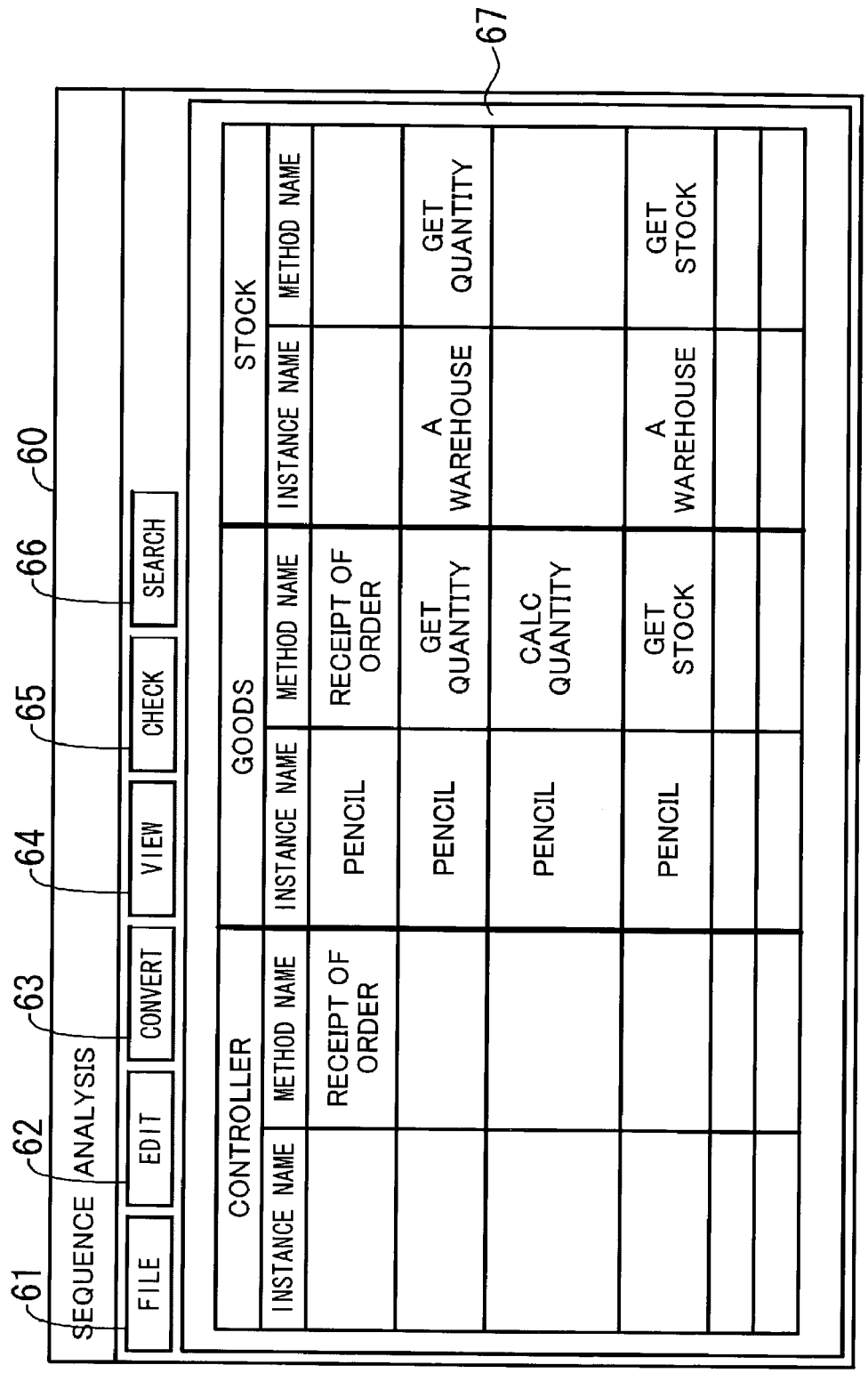
FIG. 15 is a diagram of an exemplary screen showing results of a method omission process.

Referring now to FIG. 15, a process executed when the menu item "Detail/Omit" 64c of the button 64 is selected will be described.

When the menu item "Detail/Omit" 64c is selected, the display processing section 23 causes the display section 26 to display a screen (not shown) for selecting display items, and accepts the selection of display items. Specifically, a screen is displayed which permits the operator to specify whether to display each of the connection source class, connection source instance, sequence diagram ID, instance name, generated instance, sequence No., method name, parameter, return value, connection target class and connection target instance, and the entry of items that need to be displayed is accepted.

Subsequently, the display processing section 23 selects only the required items that have been specified, from the sequence table, and causes the display section 26 to display the selected items. For example, if the instance name and the method name alone are selected as the required items to be displayed, information shown in the display area 67 in FIG. 15 is displayed.

In the illustrated example, only the instance names and method names of the individual classes are displayed. As illustrated, the "Pencil" instance, for example, calls the "get quantity" method of the instance "A Warehouse" of the "Stock" class. Also, the "calc quantity" method calls itself, namely, the "calc quantity" of the "Pencil" instance of the "Goods" class.

Thus, by excluding items other than the required items from the screen, it is possible to enhance the surveyability of the whole sequence table and also to improve the search speed.

The following describes an operation performed when the button 64 is depressed on the screen 60 shown in FIG. 15 and then the menu item "Arrow" 64a is selected.

When the button 64 is depressed and then the menu item "Arrow" 64a is selected, the display processing section 23 displays arrows indicating the call relationships of the individual methods if no arrows are then displayed on the sequence table. If arrows are then displayed, they are hidden from the screen. In the illustrated example, no arrows are displayed, as shown in FIG. 15, and accordingly, the display processing section 23 displays arrows. As a result, arrows are displayed as shown in FIG. 16.

In this manner, the arrows are displayed or hidden as needed, thus enabling the operator to make an optional choice as to whether the visibility of the call relationships of methods indicated by the arrows or the visibility of other information is to be enhanced.

Figure 16:
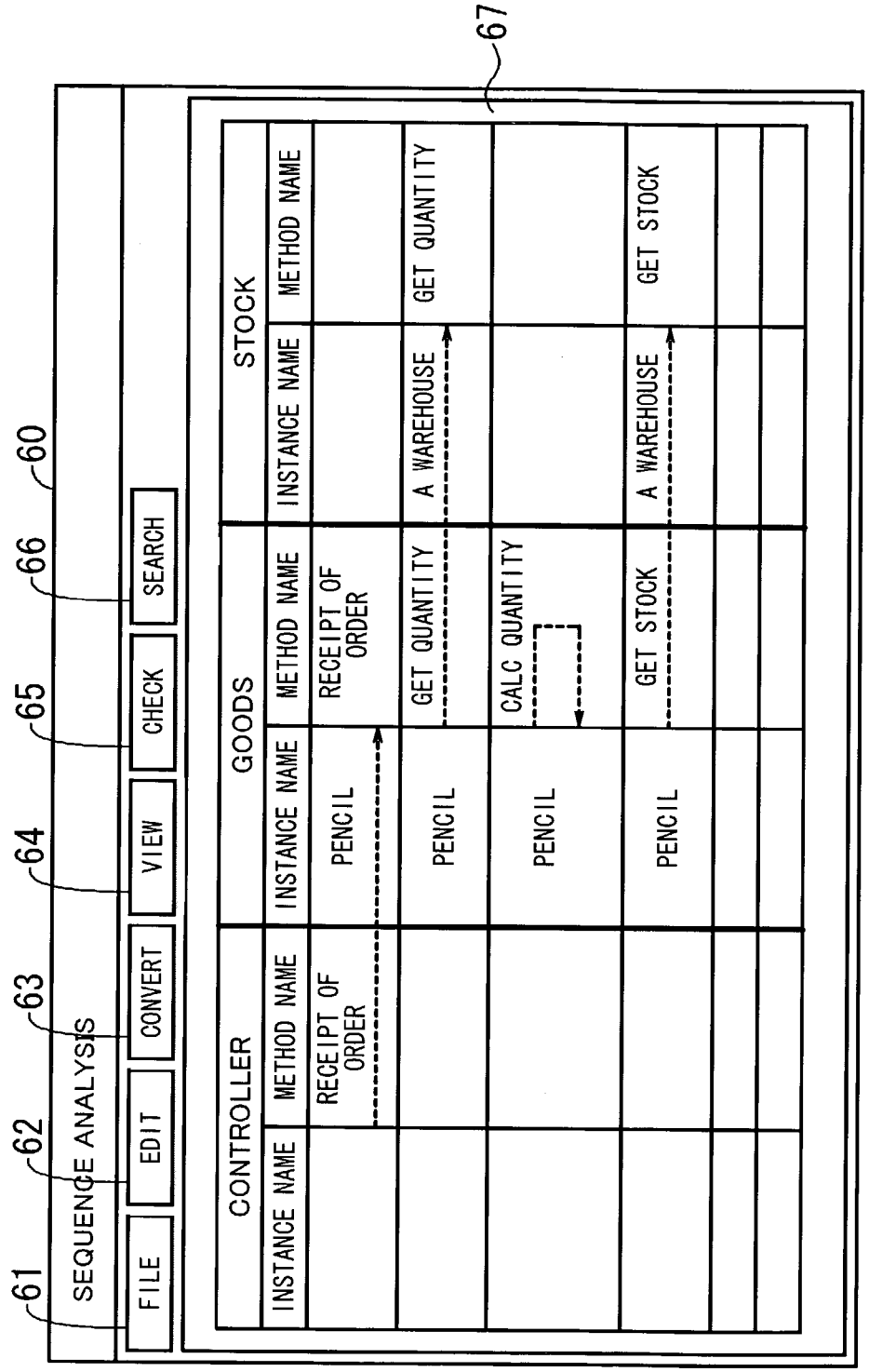
FIG. 16 is a diagram of an exemplary screen showing results of a class moving process.

The following describes an operation performed when the menu item "Move" 62a is selected following the depression of the button 62 on the screen shown in FIG. 16.

The selection of the menu item "Move" 62a permits movement of a desired class to a desired position. In this case, the movement is permitted only on a class-by-class basis. In FIG. 16, if the "Controller" class, for example, is selected (e.g., by clicking a mouse button) as an object to be moved and then an operation is performed to move the "Controller" class to a position to the right of the "Stock" class, the display processing section 23 rearranges the classes so that the "Controller" class may be located to the right of the "Stock" class on the sequence table, and supplies data indicating the rearranged classes to the display section 26 to be displayed thereby.

Figure 17:
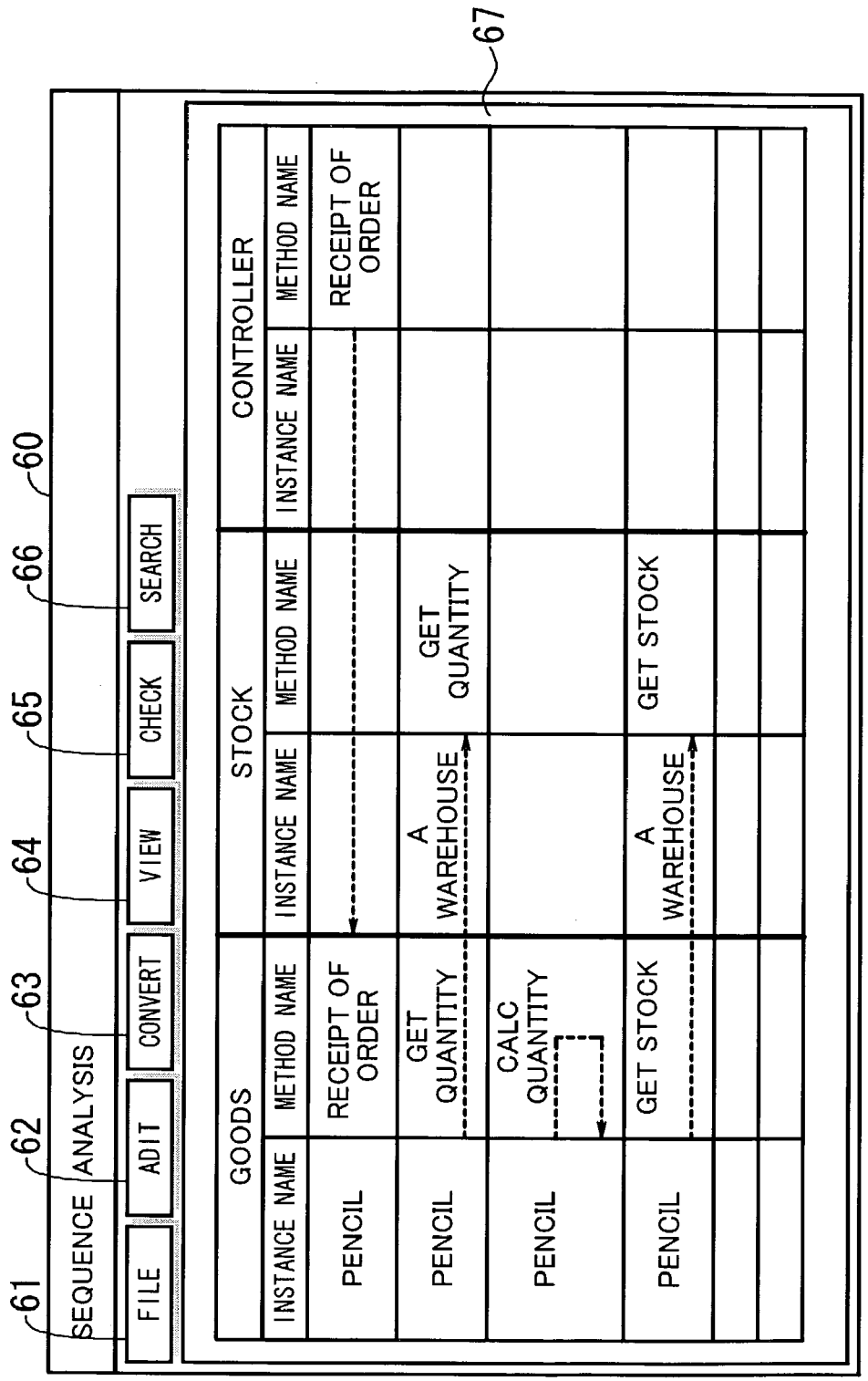
FIG. 17 is a diagram of an exemplary screen showing results of an arrow hiding process.

As a result, the "Controller" class appears to the right of the "Stock" class, as shown in the display area 67 in FIG. 17, and also in this case, the directions of the arrows are changed appropriately on screen.

In this manner, the positions of classes can be freely changed, and therefore, by rearranging the classes so as to meet purposes, it is possible to learn the referential relationships of methods more easily.

Although in the above example, the movement of a class is explained, it is also possible to delete, display or hide from screen, and copy a desired class. When a class is deleted, however, care must be taken because the call relationships between the class to be deleted and other classes are lost. This applies to the case of hiding a class from screen. In this manner, the contents displayed on screen can be edited on a class-by-class basis, so that the mode of display can be changed so as to meet purposes, thus improving the operation efficiency.

Figure 18:
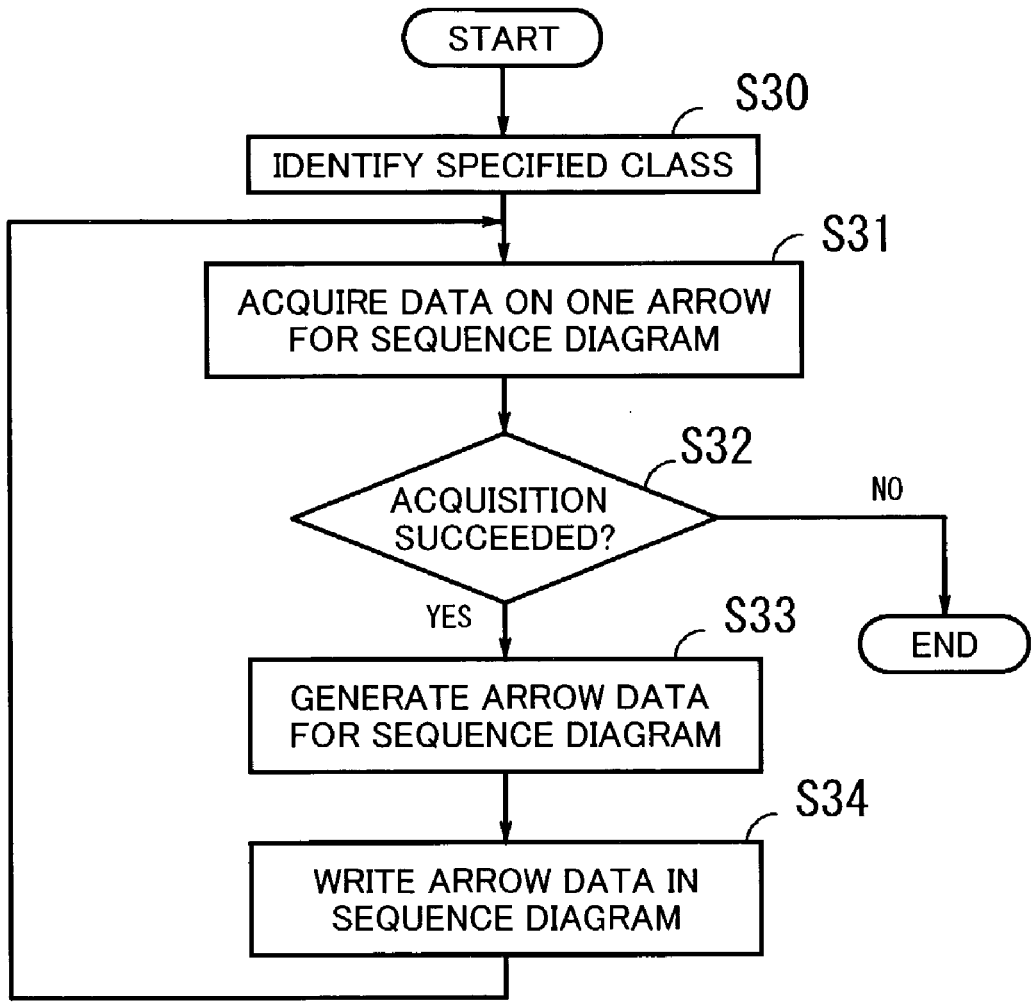
FIG. 18 is a flowchart illustrating an exemplary process for reverse conversion from a sequence table to a sequence diagram.

If, with a desired class selected, the button 63 is depressed and the menu item "Reverse Conversion" 63b is selected, a process described below with reference to FIG. 18 is performed. Upon start of the process shown in the flowchart, the following steps are executed.

Step S30:

In accordance with information acquired from the input section 27 via the display processing section 23, the reverse conversion section 24 identifies the specified class. For example, if the information input from the input section 27 specifies a plurality of classes, the reverse conversion section 24 identifies these specified classes.

Step S31:

The reverse conversion section 24 acquires data corresponding to one arrow in the sequence diagram, included in the specified class. Specifically, the connection source class and instance and connection target class and instance of the arrow, the method name, etc. are acquired.

Step S32:

The reverse conversion section 24 determines whether or not the acquisition of data corresponding to an arrow was successful. If the acquisition was successful, Step S33 is executed; if not, the process is ended.

Step S33:

Based on the data (data indicating the connection source and target) corresponding to the arrow acquired in Step S31, the reverse conversion section 24 generates arrow data (data obtained by dividing and relocating the data acquired in Step S31 according to classes) for a sequence diagram.

Step S34:

The reverse conversion section 24 writes the arrow data generated in Step S33 into a corresponding part of the sequence diagram, whereupon the flow returns to Step S31 to repeat the subsequent process in the same manner as explained above.

The aforementioned process makes it possible to specify a desired class group on the sequence table and to create a sequence diagram corresponding to the specified class group, whereby a sequence diagram focusing only on the required classes can be created with ease.

The following describes a process executed when the menu item "Crosscheck" 65a is selected following the depression of the button 65.

Figure 19:
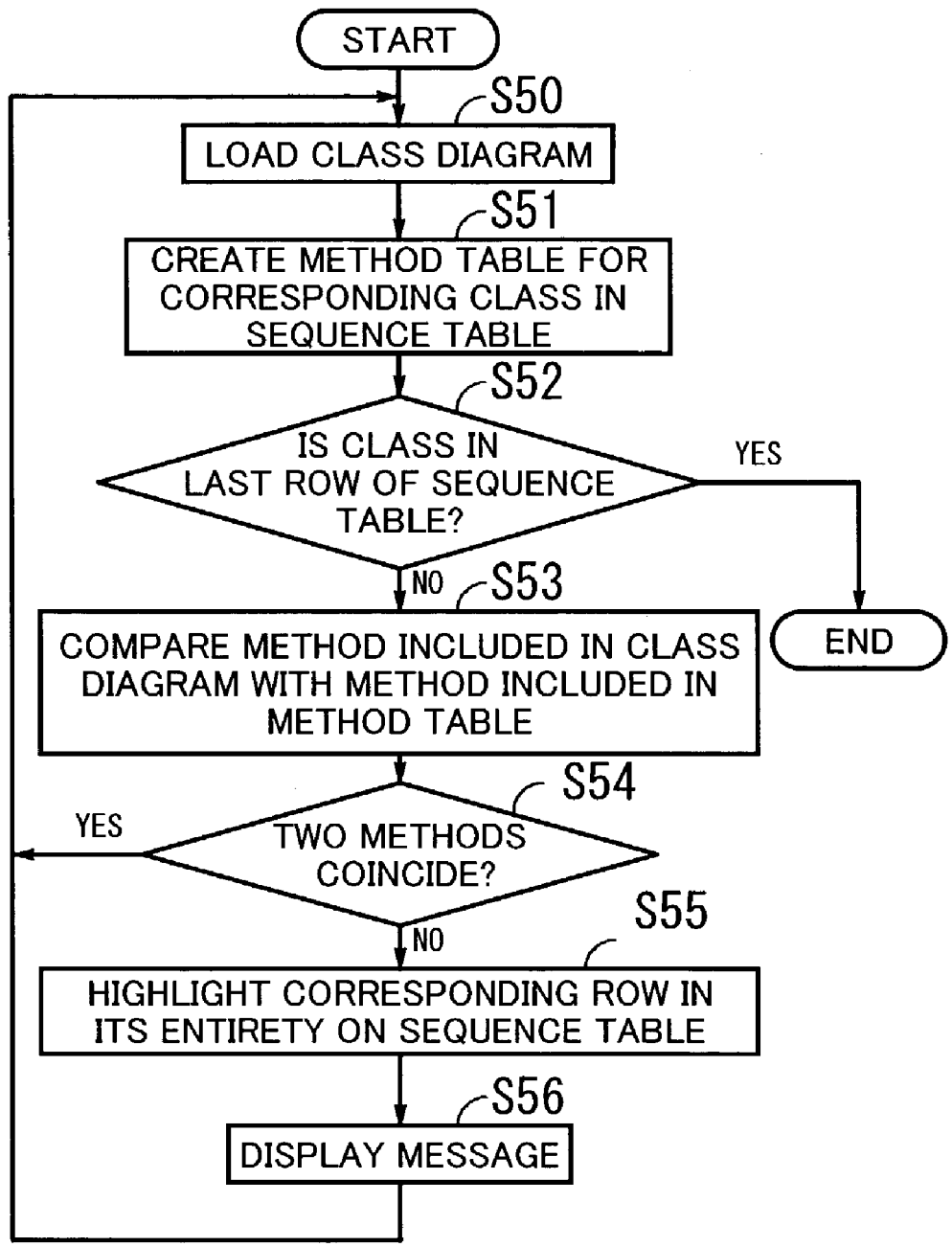
FIG. 19 is a flowchart illustrating an exemplary process for comparing a class diagram with a sequence table.

When the button 65 is depressed and then the menu item "Crosscheck" 65*a* is selected, the checking section 25 executes a process shown in the flowchart of FIG. 19.

Step S50:

The checking section 25 loads a class diagram shown in FIG. 5 from the database 20.

Step S51:

The checking section 25 creates a method table listing methods included in the corresponding class (class corresponding to the class diagram loaded in Step S50) in the sequence table.

Step S52:

The checking section 25 determines whether or not the acquired class is in the last row of the sequence table. If the acquired class is in the last row, the process is ended; if not, Step S53 is executed.

Step S53:

The checking section 25 compares the method included in the class diagram with a corresponding method included in the method table.

Step S54:

The checking section 25 determines whether the two methods coincide or not based on the result of comparison in Step S53. If the two coincide, it is judged that the method is normally defined and the flow returns to Step S50 to repeat the subsequent process in the same manner as described above. On the other hand, if the two methods do not coincide, Step S55 is executed.

Step S55:

The checking section 25 highlights the corresponding row in its entirety shown on the sequence table.

Step S56:

The checking section 25 displays an error message notifying that there is a method inconsistent with the class diagram.

Methods described in sequence diagrams need to be defined as methods associated with classes in class diagrams. The process described above makes it possible to automatically determine whether or not the methods described in the sequence diagrams are defined as methods in the class diagrams.

In the aforementioned example, the method called from the class included in a class diagram is checked to see if it coincides with the corresponding method in the sequence diagram. Since an objective of the present invention is to check up inconsistency between class and sequence diagrams, however, the invention should be understood to also cover a construction whereby inconsistency between the classes in the class diagrams and those in the sequence diagrams is checked up, though not illustrated.

Figure 20:
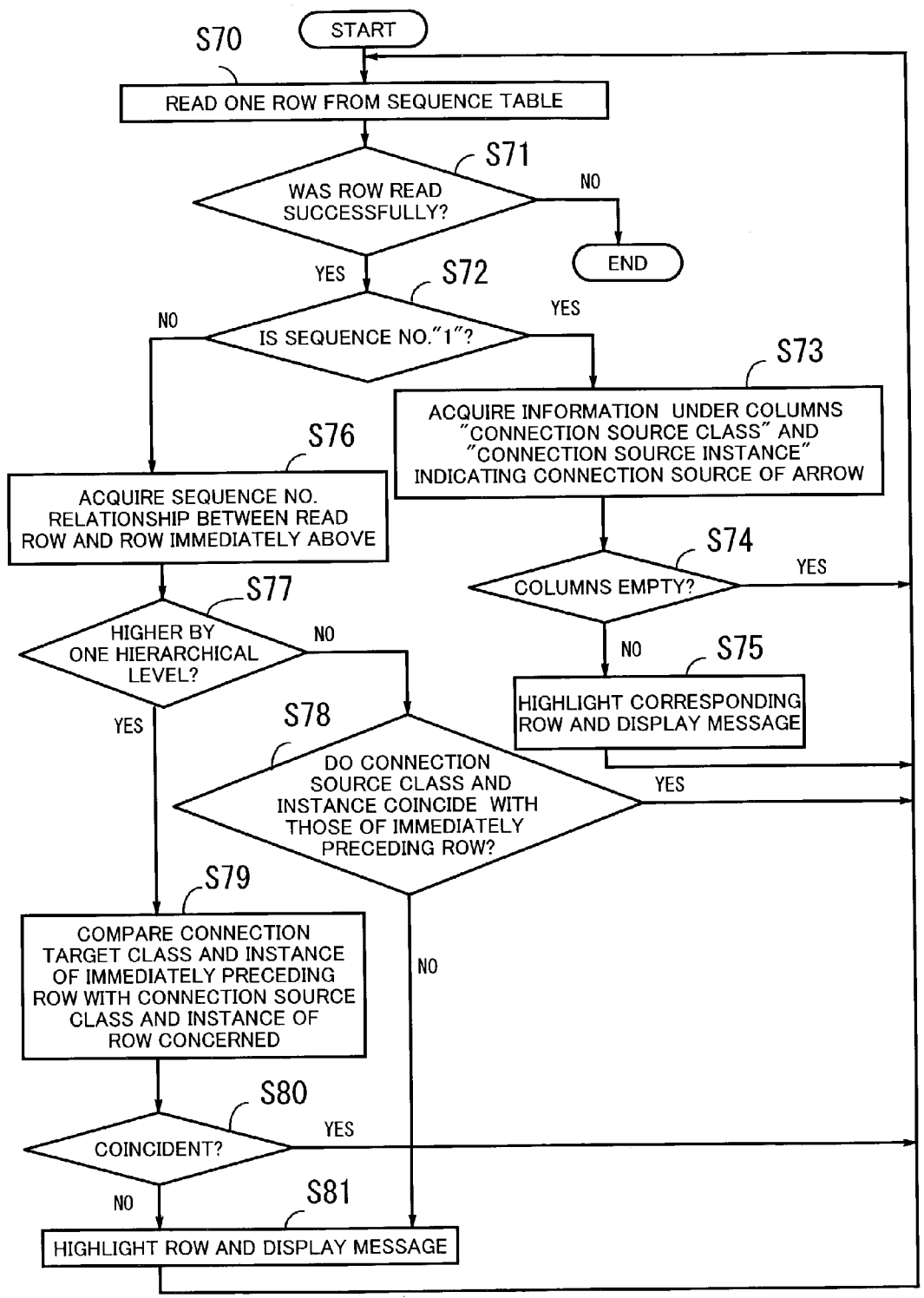
FIG. 20 is a flowchart illustrating an example of a sequence number checking process.

Referring now to FIG. 20, a process executed when the menu item "Sequence No." 65*b* is selected following the depression of the button 65 will be described. Upon start of the process shown in the flowchart, the following steps are executed.

Step S70:

The checking section 25 reads a predetermined row in the sequence table.

Step S71:

The checking section 25 determines whether or not a row was successfully read, that is, whether or not there is an unprocessed row remaining. If there exists an unprocessed row and such a row is read, Step S72 is executed; if not, it is judged that there is no row to be processed and the process is ended.

Step S72:

The checking section 25 determines whether or not the sequence number of the read row is "1.", that is, whether or not the method in question is a method (entry method) with the highest hierarchical level. If the sequence number is "1.", Step S73 is executed; if not, Step S76 is executed.

Step S73:

The checking section 25 acquires information stored under the columns "Connection Source Class" and "Connection Source Instance" indicating the connection source of the arrow.

Step S74:

The checking section 25 determines whether or not the columns are both empty. If both of the columns are empty, it is judged that the sequence number is normal and the flow returns to Step S70 to repeat the subsequent process; if not, Step S75 is executed.

Step S75:

A class with the sequence number "1." is usually an entry class and thus the connection source class and instance associated therewith should be empty. If any information is stored under these columns, the checking section 25 judges that the sequence number is in error. Accordingly, the corresponding row is highlighted and a message indicating the occurrence of error is displayed.

Step S76:

The checking section 25 acquires the relationship of sequence number between the row in question and the one immediately above.

Step S77:

The checking section 25 determines whether or not the sequence number of the immediately preceding row shows a class higher by one hierarchical level. If the sequence number shows a class higher by one hierarchical level, Step S79 is executed; if not, Step S78 is executed. In this case, the level difference of one hierarchical level is discriminated by looking up the number of dots "." included in the sequence number, because the larger the number of dots, the deeper in hierarchy the sequence is.

Step S78:

The checking section 25 determines whether or not the connection source class and instance of the immediately preceding row coincide with the respective connection source class and instance of the row in question. If these connection source classes and instances coincide respectively, then the sequences are of the same hierarchical level and the sequence number is normal, whereupon the flow returns to Step S70 to repeat the subsequent process; if not, Step S81 is executed.

Step S79:

The checking section 25 compares the connection target class and instance of the immediately preceding row with the respective connection source class and instance of the row in question.

Step S80:

The checking section 25 determines whether the classes and instances of the two rows respectively coincide or not based on the result of comparison in Step S79. If the classes and the instances coincide respectively, then the immediately preceding row is a sequence higher than the row in question by one hierarchical level, and the row in question is a sequence lower by one hierarchical level. In such cases, the sequence number is judged normal, and the flow returns to Step S70 to repeat the subsequent process; otherwise Step S81 is executed.

Step S81:

The checking section 25 judges that the immediately preceding row and the row in question are in anomalous sequence. Accordingly, the checking section highlights the row in question and displays a message notifying anomaly, whereupon the flow returns to Step S70 to repeat the subsequent process in the same manner as explained above.

The process described above makes it possible to automatically determine whether the sequence numbers are assigned normally or not.

Figure 21:
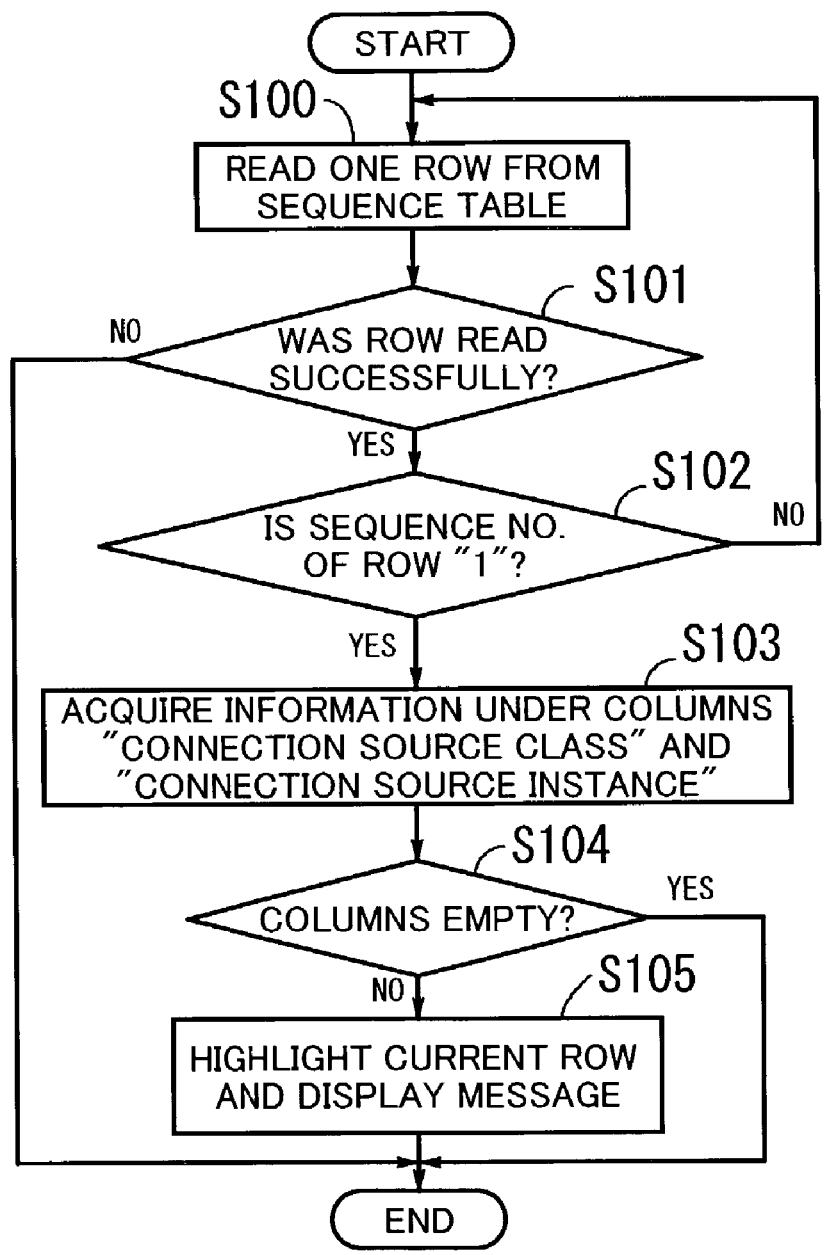
FIG. 21 is a flowchart illustrating an example of an entry method checking process.

Referring now to FIG. 21, a process executed when the menu item "Entry" 65c is selected following the depression of the button 65 will be described. Upon start of the process shown in the flowchart, the following steps are executed.

Step S100:

The checking section 25 reads a predetermined row from the sequence table.

Step S101:

The checking section 25 determines whether or not a row was successfully read, that is, whether or not there is an unprocessed row remaining. If a row was successfully read, Step S102 is executed; if not, it is judged that there remains nothing to be processed, and accordingly, the process is ended.

Step S102:

The checking section 25 determines whether the sequence number of the read row is "1." or not. If the sequence number is "1.", Step S103 is executed; if not, the flow returns to Step S100 to repeat the subsequent process.

Step S103:

The checking section 25 acquires information stored under the columns "Connection Source Class" and "Connection Source Instance" indicating the source of connection of the arrow.

Step S104:

The checking section 25 determines whether or not these columns are both empty. If the columns are not empty, Step S105 is executed; otherwise the process is ended.

Step S105:

A class with the sequence number "1". is usually an entry class and thus the connection source class and instance associated therewith are empty. If any information is stored under these columns, the checking section 25 judges that there is an error. Accordingly, the row in question is highlighted and a message notifying the occurrence of error is displayed, followed by the termination of the process.

The process described above makes it possible to determine whether the entry method is normal or not.

Figure 22:
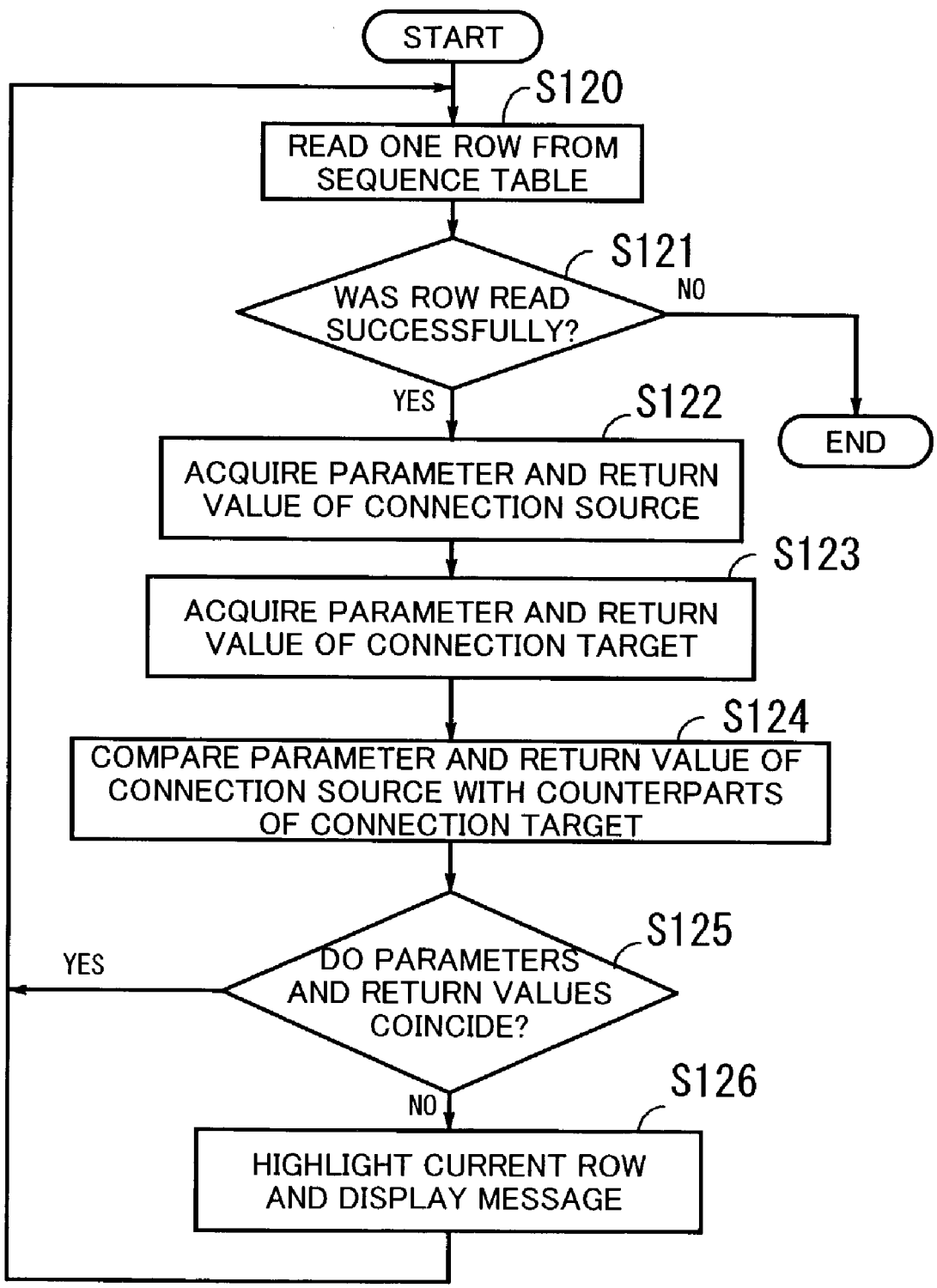
FIG. 22 is a flowchart illustrating an example of a parameter checking process.

Referring now to FIG. 22, a process executed when the menu item "Parameter" 65d is selected following the depression of the button 65 will be described. This is a process for determining whether the parameters and return values of methods described in the sequence table are normal or not. Upon start of the process shown in the flowchart, the following steps are executed.

Step S120:

The checking section 25 reads a predetermined row from the sequence table.

Step S121:

The checking section 25 determines whether or not a row was successfully read. Namely, if there is no unprocessed row remaining in the sequence table, the process is ended; otherwise Step S122 is executed.

Step S122:

The checking section 25 acquires the parameter and return value of the connection source of the predetermined row read in Step S120.

Step S123:

The checking section 25 acquires the parameter and return value of the connection target of the predetermined row read in Step S120.

Step S124:

The checking section 25 compares the parameters and return values of the connection source and target with each other as to their type and number.

Step S125:

The checking section 25 determines based on the result of comparison in Step S124 whether or not the parameters and return values of the connection source and target respectively coincide with each other. If the parameters and the return values respectively coincide with each other, they are judged normal and the flow returns to Step S120 to repeat the subsequent process; if not, Step S126 is executed.

Step S126:

The checking section 25 highlights the current row and displays a message notifying that the parameter and the return value are not normal, whereupon the flow returns to Step S120 to repeat the subsequent process in the same manner as explained above.

The process described above makes it possible to automatically detect an erroneous row with respect to which the parameters of the connection source and target included in the sequence table do not coincide with each other.

Although in the foregoing embodiment, a sequence table is generated from sequence diagrams, it is also possible to generate a sequence table from a source file, for example. In this case, a sequence table can be obtained by dividing the source file according to classes, identifying instances derived from the individual classes as well as methods included in the individual instances, and analyzing call relationships of the methods by means of text analysis. The same process as described above is performed on the information obtained in this manner, whereby a method table can be generated.

Also, it is to be noted that the aforementioned mode of displaying the sequence table is given by way of example, and that the present invention is not limited to the illustrated mode only.

The processing function described above can be achieved by a computer, and in this case, the process for performing the function of the sequence analysis apparatus is described as a program recorded on a computer-readable recording medium. The program is executed by a computer, whereby the aforementioned process is accomplished by the computer. The computer-readable recording medium includes magnetic recording device, semiconductor memory, etc. To place the program on the market, the program may be stored in portable recording media, such as CD-ROMs (Compact Disk Read Only Memories) or floppy disks, for distribution. Alternatively, the program may be stored in the storage device of a computer connected to a network and may be transferred to other computers through the network. The program is stored in a hard disk drive or the like of a computer, and when executing the program, the program is loaded into the main memory and executed.

As described above, the present invention provides a sequence analysis method for analyzing sequence of a program described in an object language, the method comprising a class name acquisition step of acquiring class names of classes constituting the program, an instance name acquisition step of acquiring instance names of instances derived from the individual classes, a method name acquisition step of acquiring method names of methods included in the individual instances, a call relationship acquisition step of acquiring call relationships of the individual methods, and a sequence table display step of displaying a sequence table in which are shown a tabulated list of information acquired in the class name acquisition step, the instance name acquisition step and the method name acquisition step, as well as the call relationships of the individual methods obtained based on information acquired in the call relationship acquisition step. It is therefore possible to enhance the surveyability of the sequence of a system described in an object-oriented fashion.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable recording medium recording a program for causing a computer to examine sequence of a program described in an object language,
   wherein said recorded program causes the computer to analyze as:
   class name acquisition means for acquiring class names of classes constituting the program from a given sequence diagram thereof;
   instance name acquisition means for acquiring instance names of instances derived from the individual classes from the given sequence diagram;
   method name acquisition means for acquiring method names of methods included in the individual instances from the given sequence diagram;
   call relationship acquisition means for acquiring call relationships of the individual methods from the given sequence diagram; and
   sequence table display means for displaying a sequence table havinq a plurality of columns corresponding to the class names acquired by said class name acquisition means, each column showing the instance names and the method names acquired by said instance name acquisition means and said method name acquisition means, the sequence table including directional arrows drawn between the columns to indicate the call relationships of the individual methods.

2. The recording medium according to claim 1, wherein the computer is caused to function further as class selection means permitting selection of a class to be displayed by said sequence table display means.

3. The recording medium according to claim 1, wherein the computer is caused to function further as class display position moving means permitting movement of a class displayed by said sequence table display means to a desired display position.

4. The recording medium according to claim 1, wherein the computer is caused to function further as preserve/delete option means permitting option to preserve or delete information relating to individual classes displayed by said sequence table display means.

5. The recording medium according to claim 1, wherein the computer is caused to function further as method sorting means for sorting the methods such that identical or similar methods are shown in adjacent regions on the sequence table.

6. The recording medium according to claim 1, wherein the computer is caused to function further as sequence diagram generation means permitting a desired class to be specified on the sequence table to generate a sequence diagram including only the specified class.

7. The recording medium according to claim 1, wherein the computer is caused to function further as noncoincidence notification means for comparing a class or method included in a class diagram indicating a static structure of classes constituting the program, with a corresponding class or method included in the sequence table, and providing a notification if noncoincidence of the classes or methods is found.

8. The recording medium according to claim 1, wherein the computer is caused to function further as sequence number determination means for determining whether a sequence number assigned to each of the methods is proper or not by utilizing a hierarchical structure of the classes.

9. The recording medium according to claim 1, wherein the computer is caused to function further as parameter determination means for determining whether parameters of connection source and connection target of a method coincide with each other as to type and number.

10. A sequence analysis apparatus for analyzing sequence of a program described in an object language, comprising:
    class name acquisition means for acquiring class names of classes constituting the program from a given sequence diagram thereof;
    instance name acquisition means for acquiring instance names of instances derived from the individual classes from the given sequence diagram;
    method name acquisition means for acquiring method names of methods included in the individual instances from the given sequence diagram;
    call relationship acquisition means for acquiring call relationships of the individual methods from the given sequence diagram; and
    sequence table display means for displaying a sequence table having a plurality of columns corresponding to the class names acquired by said class name acquisition means, each column showing the instance names and the method names acquired by said instance name acquisition means and said method name acquisition means, the sequence table including directional arrows drawn between the columns to indicate the call relationships of the individual methods.

11. A sequence analysis method for analyzing sequence of a program described in an object language, comprising:
    acquiring class names of classes constituting the program from a given sequence diagram thereof;
    acquiring instance names of instances derived from the individual classes from the given sequence diagram;
    acquiring method names of methods included in the individual instances;
    acquiring call relationships of the individual methods from the given sequence diagram; and
    displaying a sequence table having a plurality of columns corresponding to the class names acquired in said acquiring class names, each column showing the instance names and the method names acquired in, said acquiring instance names, method names, the sequence table including directional arrows drawn between the columns to indicate the call relationships of the individual methods.

* * * * *

UNITED STATES PATENT AND TRADEMARK OFFICE
CERTIFICATE OF CORRECTION

PATENT NO. : 7,062,751 B2
APPLICATION NO. : 10/455445
DATED : June 13, 2006
INVENTOR(S) : Hiroshi Miyazaki et al.

It is certified that error appears in the above-identified patent and that said Letters Patent is hereby corrected as shown below:

Column 15, line 38, change "havinq" to --having--.
Column 16, line 59, change "names, method" to --names, and method--.

Signed and Sealed this

Twelfth Day of September, 2006

JON W. DUDAS
*Director of the United States Patent and Trademark Office*